(12) United States Patent
Kasuya et al.

(10) Patent No.: US 6,428,633 B1
(45) Date of Patent: Aug. 6, 2002

(54) STEEL FOR WELDED STRUCTURES AND WELDING WIRE

(75) Inventors: Tadashi Kasuya; Shigeru Ohkita; Masao Fuji, all of Futtsu; Naoki Saitou, Tokai; Junichi Kobayashi; Toshihiko Chiba, both of Futtsu, all of (JP)

(73) Assignee: Nippin Steel Corporation, Tokyo (JP)

( * ) Notice: Subject to any disclaimer, the term of this patent is extended or adjusted under 35 U.S.C. 154(b) by 0 days.

(21) Appl. No.: 09/174,848

(22) Filed: Oct. 19, 1998

(30) Foreign Application Priority Data

| Oct. 20, 1997 | (JP) | ............................................. 9-287269 |
| Oct. 29, 1997 | (JP) | ............................................. 9-297290 |
| Apr. 27, 1998 | (JP) | ............................................. 10-117422 |
| May 12, 1998 | (JP) | ............................................. 10-128946 |
| Aug. 7, 1998 | (JP) | ............................................. 10-224717 |
| Aug. 7, 1998 | (JP) | ............................................. 10-224726 |

(51) Int. Cl.[7] ........................ C22C 38/08; C22C 38/40
(52) U.S. Cl. ........................ 148/336; 420/94; 420/97; 420/119
(58) Field of Search ........................ 148/336; 420/94, 420/97, 119

(56) References Cited

U.S. PATENT DOCUMENTS 3,970,447 A * 7/1976 Lang ........................ 420/119
4,152,148 A * 5/1979 Machmeier ........................ 420/119
6,059,177 A * 5/2000 Watanabe et al. ........................ 22/262.41

OTHER PUBLICATIONS

English abstract of Russian patent 859,086, Aug. 30, 1981.*

*Proceedings of the National Conference of the Japan Welding Society*, vol. 51, 1992, pp. 278–279, "The Effect of Transformation On Residual Stress—Stress Releasement By Transformation Superplasticity (Part 7)", H. Murata et al.

* cited by examiner

Primary Examiner—Deborah Yee
(74) Attorney, Agent, or Firm—Kenyon & Kenyon

(57) ABSTRACT

In order to conduct welding so that the welded steel shows a decreased residual stress after welding without a post treatment such as a PWHT, the steel for welded structures and the welding wire of the present invention starts a transformation from austenite into martensite at a temperature (Ms temperature) from at least 200° C. to up to 350° C., and has a yield strength from at least 60 kg/mm$^2$ to up to 120 kg/mm$^2$ at the transformation starting temperature. The multipass welding process of the present invention comprises forming a weld metal having a Ms temperature of 150° C. to 300° C., and TIG remelt-run welding the surface of the final layer.

2 Claims, 1 Drawing Sheet the cause of the residual stress is counterbalanced by an expansion involved in the martensite transformation. The thermal contraction is thus temporarily reversed into an expansion in the course of lowering the temperature, to decrease the residual stress.

STEEL FOR WELDED STRUCTURES AND WELDING WIRE

BACKGROUND OF THE INVENTION

1. Field of the Invention

The present invention relates to a steel for welded structures (steel for a welding base material), a welding wire, and a multipass welding process which decrease the residual stress of a weld zone to improve the reliability of welded structures, and which improve such various properties of welded structures, to which the residual stress is related, such as stress corrosion cracking characteristics, fatigue characteristics and brittle fracture characteristics.

2. Description of the Related Art

The most common method for decreasing the residual stress of a weld zone has been to conduct a post-weld heat treatment (PWHT) (=stress relief annealing (SR)) after finishing the preparation of a welded joint. The PWHT not only decreases the residual stress but also improves the metallurgical characteristics. However, since the PWHT also becomes a chief factor increasing the production cost of welded structures, it would be economically very advantageous to obtain predetermined characteristics of the welded structures without PWHT.

Methods for obtaining the predetermined characteristics without PWHT can be roughly classified into two categories. A method which belongs to one of the categories is one for improving various properties such as the resistance to stress corrosion cracking and the fatigue strength of a welding base material and/or welding material (such as a welding wire) so that the predetermined characteristics can be obtained even when the residual stress caused by welding is a tensile one, and many proposals therefor have heretofore been presented.

A method which belongs to the other category is one for improving a welding material (welding material) and/or welding process to decrease the residual stress caused by welding. The method utilizes the phenomenon that the stress corrosion cracking characteristics are improved when the residual stress is in a compressive state. Representative methods belonging to the category are as follows: a method which utilizes a transformation expansion produced when a weld metal transforms from austenite into martensite; a method such as a shot peening method which mechanically decreases the residual stress after welding; a method in which a weld bead is newly formed intentionally on a portion of a joint the characteristics of which cause problems, so that a compressive residual stress is distributed in the portion; and the like. Of the methods mentioned above, the latter two have the problem that in addition to the work of preparing welded structures, further work must be carried out.

On the other hand, investigations have been carried out into the method for improving welding materials and/or welding processes so that the residual stress is decreased or made a compressive one, as published, for example, in "Yosetsu Gakkai Zenkoku Taikai Koen Yokoshu (the Proceedings of the National Conference of the Japan Welding Society)," vol. 51 (1992) pages 278–279.

In the conventional process for decreasing the residual stress, the temperature (Ms temperature) at which transformation from austenite into martensite starts in a weld zone is lowered, and the transformation expansion is allowed to take place at low temperature, whereby the residual stress is decreased. The thermal contraction of the weld zone which However, even when the Ms temperature of a welding base material or welding material (such as a welding wire) is significantly low, it is difficult to substantially decrease the residual stress for the reasons described below. Even when the weld zone temporarily reaches a compressive stress state due to a martensite transformation expansion at the Ms temperature in the course of lowering the temperature, a thermal contraction is produced again in the course of lowering the temperature after completion of the transformation, and the weld metal reaches a high tensile stress state again.

As explained above, decreasing the residual stress with a steel material or welding material alone is restricted to materials having a very low Ms temperature in the prior art. When such materials are to be used, such materials must often be prepared by adding alloying elements to such a degree that the addition is not suitable for practical use. Therefore, designing a new material which does not rely on a low Ms temperature alone is desired, which is a background of the present invention in a first aspect.

Furthermore, when multipass welding is conducted, the residual stress of each of the weld beads in the final layer is not always surely decreased, and complete avoidance of the partial generation of a high residual stress is impossible even when a material having a significantly low Ms temperature is employed for the reasons described below. When a plurality of weld beads are present in the weld zone, they interact each other. As a result, even if the residual stress is decreased in some beads, the residual stress of the other beads is not decreased. Such a problem arises either in the case of using a material having a very low Ms temperature as practiced in the prior art, or in the case of using a material of new design. This is a background of the present invention in a second aspect.

As explained above, when such a method for decreasing the residual stress with a steel material or welding material alone is to be practiced, alloying elements must be added to an impractical extent. Moreover, even when such a steel material or welding material is used, there are still problems, for example, the transformation expansion of a weld zone cannot be effectively used for the residual stress due to the interaction among weld beads as in the case of multipass welding. As a result, the method for decreasing the residual stress in a weld zone has not been sufficiently established in practice.

However, even when those welding base materials and welding materials (such as welding wires) which have improved properties and which have been proposed are used, the additional use of decreasing the residual stress is extremely favorable for improving the reliability for the welded joints. Stress concentration is likely to take place in a weld zone to form a fracture initiation point. It is, therefore, extremely effective from the standpoint of improving the reliability of welded structures as a whole to decrease the residual stress of a weld zone which is present as a tensile stress on the surface of the welded structures.

SUMMARY OF THE INVENTION

An object of a first aspect of the present invention is to provide a steel for welded structures, and a welding wire, which can decrease the residual stress of a weld zone.

An object of a second aspect of the present invention is to provide a multipass welding process which solves the problem that, in a multipass weld zone, even when a material for decreasing the residual stress is used, the residual stress becomes partially high as a result of the interaction between weld beads.

According to a first standpoint of the first aspect of the present invention, the following steel is provided.

[1] A steel for welded structures which starts a transformation from austenite into martensite at a temperature from at least 200° C. to up to 350° C., and which has a yield strength from at least 60 kg/mm$^2$ to up to 120 kg/mm$^2$ at the transformation starting temperature.

[2] The steel for welded structures as stated in [1], wherein a parameter Pa defined by the formula $$Pa=C+Ni/12+Cr/24+Mo/19$$

wherein C, Ni, Cr and Mo represent respective element contents in terms of percent by weight, is from at least 0.85 to up to 1.15.

[3] The steel for welded structures as stated in [1], wherein the steel comprises, based on weight, 0.01 to 0.2% of C, 0.01 to 0.4% of Si, 0.2 to 1.5% of Mn, 8 to 12% of Ni, one or more of the following elements in the following contents: 0.005 to 0.3% of Ti, 0.005 to 0.3% of Nb and 0.05 to 0.5% of V, and the balance of Fe and unavoidable impurities, P and S of the unavoidable impurities being in respective contents of up to 0.03% and up to 0.02%.

[4] The steel for welded structures as stated in [3], wherein the steel further comprises, based on weight, one or more of the following elements in the following contents: 0.1 to 3.0% of Cr and 0.1 to 3.0% of Mo.

[5] The steel for welded structures as stated in [1], wherein the steel comprises, based on weight, 0.001 to 0.05% of C, 0.05 to 0.5% of Si, 0.4 to 2.5% of Mn, 3 to 7% of Ni, 10 to,15% of Cr, 0.001 to 0.05% of N, the content of C plus N being 0.001 to 0.06%, and the balance of Fe and unavoidable impurities, P and S of the unavoidable impurities being in respective contents of up to 0.03% and up to 0.02%.

[6] The steel for welded structures as stated in [5], wherein the steel further comprises, based on weight, one or more of the following elements in the following contents: 0.1 to 2.0% of Mo, 0.005 to 0.3% of Ti, 0.005 to 0.3% of Nb and 0.05 to 0.5% of V.

According to a second standpoint of the first aspect of the present invention, the following welding wire is provided.

[7] A welding wire for forming a weld metal in a weld joint, the weld metal starting a transformation from austenite into martensite at a temperature from at least 200° C. to up to 350° C., and having a yield strength from at least 60 kg/mm$^2$ to up to 120 kg/mm$^2$ at the transformation starting temperature.

[8] The welding wire as stated in [7], wherein a parameter Pa defined by the formula $$Pa=C+Ni/12+Cr/24+Mo/19$$

wherein C, Ni, Cr and Mo represent the respective element contents in terms of percent by weight, is from at least 0.85 to up to 1.15.

[9] The welding wire as stated in [7], wherein the welding wire comprises, based on weight,. 0.01 to 0.2% of C, 0.1 to 0.5% of Si, 0.01 to 1.5% of Mn, 8 to 12% of Ni, one or more of the following elements in the following contents: 0.01 to 0.4% of Ti, 0.01 to 0.4% of Nb and 0.3 to 1.0% of V, and the balance of Fe and unavoidable impurities, P and S of the unavoidable impurities being in respective contents of up to 0.03% and up to 0.02%.

[10] The welding wire as stated in [9], wherein the welding wire further comprises, based on weight, one or more of the following elements in the following contents: 0.05 to 0.4% of Cu, 0.1 to 3.0% of Cr, 0.1 to 3.0% of Mo and 0.1 to 2.0% of Co.

[11] The welding wire as stated in [7], wherein the welding wire comprises, based on weight, 0.001 to 0.05% of C, 0.1 to 0.7% of Si, 0.4 to 2.5% of Mn, 4to 8% of Ni, 10 to 15% of Cr, 0.001 to 0.05% of N, the content of C plus N being 0.001 to 0.06%, and the balance of Fe and unavoidable impurities, P and S of the unavoidable impurities being in respective contents of up to 0.03% and up to 0.02%.

[12] The welding wire as stated in [11], wherein the welding wire further comprises, based on weight, one or more of the following elements in the following contents: 0.1 to 2.0% of Mo, 0.05 to 0.4% of Cu, 0.005 to 0.3% of Ti, 0.005 to 0.3% of Nb and 0.05 to 0.5% of V.

According to the second aspect of the present invention, the following multipass welding process is provided.

[13] A multi-pass welding process, comprising the steps of: forming a weld metal which starts a transformation from austenite into martensite at a temperature from at least 150° C. to up to 300° C., and TIG remelt-run welding the whole surface of the final layer.

[14] The multi-pass welding process as stated in [13], wherein a parameter Pa defined by the formula $$Pa=C+Ni/12+Cr/24+Mo/19$$

wherein C, Ni, Cr and Mo represent the respective element contents in terms of percent by weight, of the welding wire used in the process is from at least 0.95 to up to 1.30.

[15] The multi-pass welding process as stated in [13], wherein the welding wire comprises, based on weight, 0.01 to 0.2% of C, 0.1 to 0.5% of Si, 0.01 to 1.5% of Mn, 8 to 12% of Ni, one or more of the following elements in the following contents: 0.01 to 0.4% of Ti, 0.01 to 0.4% of Nb and 0.3 to 1.0% of V, and the balance of Fe and unavoidable impurities, P and S of the unavoidable impurities being in respective contents of up to 0.03% and up to 0.02%.

[16] The multi-pass welding process as stated in [15], wherein the welding wire further comprises, based on weight, one or more of the following elements in the following contents: 0.05 to 0.4% of Cu, 0.1 to 3.0% of Cr, 0.1 to 3.0% of Mo and 0.1 to 2.0% of Co.

[17] The multi-pass welding process as stated in [13], wherein the welding wire comprises, based on weight, 0.001 to 0.05% of C, 0.1 to 0.7% of Si, 0.4 to 2.5% of Mn, 4 to 8% of Ni, 10 to 15% of Cr, 0.001 to 0.05% of N, the content of C plus N being 0.001 to 0.06%, and the balance of Fe and unavoidable impurities, P and S of the unavoidable impurities being in respective contents of up to 0.03% and up to 0.02%.

[18] The multi-pass welding process as stated in [17], wherein the welding wire further comprises, based on weight, one or more of the following elements in the following contents: 0.1 to 2.0% of Mo, 0.05 to 0.4% of Cu, 0.005 to 0.3% of Ti, 0.005 to 0.3% of Nb and 0.05 to 0.5% of V.

DETAILED DESCRIPTION OF THE PREFERRED EMBODIMENT

Figure 1:
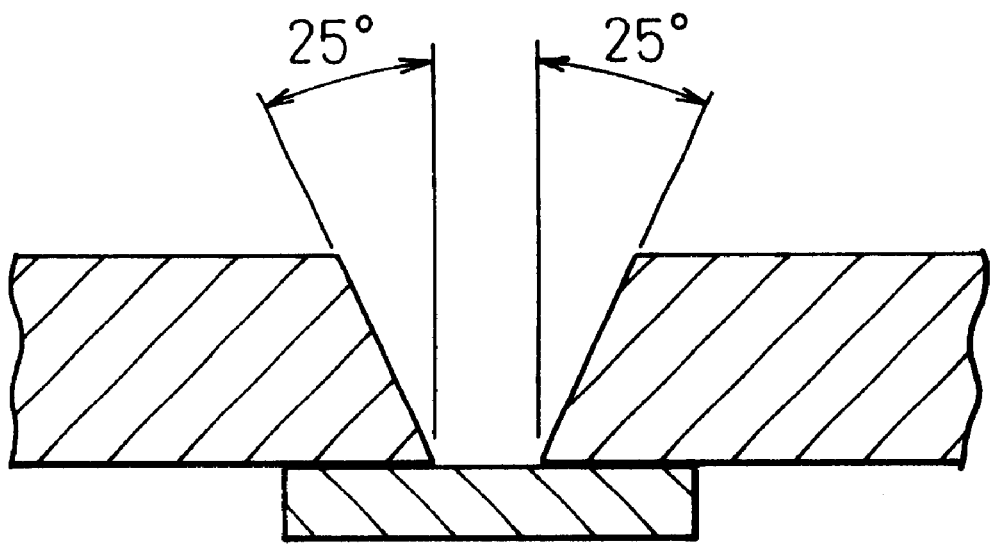
FIG. 1 is a cross-sectional view showing a groove shape for preparing a welded joint.

The fundamental idea of the first aspect of the present invention will be explained below.

In order to decrease the residual stress of a weld metal and a heat affected zone, the method of utilizing an expansion of transformation such as a martensite transformation is the most hopeful one. Investigations have been made in the prior art by paying attention to low Ms temperature materials, based on the idea. However, thermal contraction is produced again after completion of the transformation, and as a result, finally decreasing the residual stress has been difficult for the reasons explained below. Even when an expansion involved in the transformation is, for-example, from 5 to 10%, an expansion amount necessary for changing a tensile yield stress state to a compressive yield stress state is about 0.4% in terms of a linear expansion at the most for a steel material having a yield strength of 40 kg/mm$^2$. The remainder of the transformation expansion, therefore, does not contribute toward decreasing the residual stress, though it influences welding deformation.

The phenomenon is considered to be characteristic of a martensite transformation. That is, the phenomenon is considered to be produced by the characteristics that the transformation substantially finishes at temperature directly below the Ms temperature. While the following assumptions are made: the transformation of a weld zone finish immediately at the Ms temperature in the course of cooling the weld zone; and the weld zone is in a compressive state after reaching room temperature, the level of the Ms temperature will be examined.

When a weld zone temperature reaches the Ms temperature, a transformation starts, and the weld zone expands. The expansion causes the weld zone to become in a compressive state, and the stress reaches the compressive yield stress. Although the transformation expansion further proceeds even when the weld zone reaches a compressive yield stress state, the stress state is maintained and the transformation of the welded joint proceeds because the stress of the weld zone has already been in the compressive yield stress state. When the transformation finishes, the thermal contraction involved in the temperature lowering is produced again. As a result, the stress gradually increases from the compressive yield stress state, and finally reaches a tensile stress state. Accordingly, in order to maintain the weld zone in a compressive stress state, the thermal strain from the Ms to room temperatures should be smaller than the absolute value of an elastic strain corresponding to the compressive yield stress. When the room temperature is assumed to be 20° C. for the sake of simplicity, the following formula should hold in order to satisfy the condition:

$$\alpha(T-20) < \sigma_y/E \tag{1}$$

that is, $$T < 20 + \sigma_y/(E\alpha) \tag{2}$$

wherein T is the Ms temperature, $\sigma_y$ is the yield stress, E is the Young's modulus and a is the thermal expansion coefficient. In addition, the left-hand side of the formula (1) represents a thermal contraction amount produced from the temperature of T° C. to 20° C., and the right-hand side thereof represents an elastic strain corresponding to the yield stress state. When E and α are assumed to be 21,000 kg/mm$^2$ and 1.5×10$^{-5}$, respectively, T becomes as follows from the formula (2):

$$T < 150° C.(\sigma_y = 40 \text{ kg/mm}^2) \tag{3}$$

$$T < 180° C.(\sigma_y = 50 \text{ kg/mm}^2) \tag{4}$$

$$T < 210° C.(\sigma_y = 60 \text{ kg/mm}^2) \tag{5}$$

That is, according to the idea, a high tensile strength steel of 490 MPa class ($\sigma_y \approx 40$ kg/mm$^2$) cannot have a compressive residual stress so long as the steel is made to have a Ms temperature of up to 150° C. In preparing the formula (1), assumptions including the following ones are made: the weld zone is completely constrained by the surroundings; and the stress state is one dimensional. However, it can be considered that essentially the same phenomenon takes place. In order to make the weld zone have a compressive residual stress by making it have a low Ms temperature in the prior art, the Ms temperature must be lower than 200° C. Since the weld zone does not reach a compressive stress state so long as the Ms temperature is not made very low as mentioned above, the effect of decreasing the residual stress of the weld zone is not sufficient in the prior art.

As explained above, the method for decreasing the residual stress of a weld zone in which attention is paid to lowering the Ms temperature has the problem that the Ms temperature must be lowered to an impractical level.

However, it can be understood from the study as stated above that there are at least two methods for decreasing the residual stress of a weld zone.

One is a method in which the Ms temperature is conventionally lowered. That is, when the weld zone is made to transformation expand at temperature as low as possible, the thermal contraction amount subsequent to the transformation expansion becomes small and, as a result, decreasing the residual stress must become possible. However, as explained above, the method is not practical because a sufficient effect of decreasing the residual stress cannot be obtained unless the Ms temperature is very low.

The prior art has such a problem because it has paid too much attention to the Ms temperature and overlooked the fact that most of the transformation expansion results in a weld zone deformation. That is, the elastic strain change for changing a weld zone in a tensile yield stress state to a weld zone in a compressive yield stress state is about 0.4% at the most in terms of a linear expansion when the yield strength is 40 kg/mm$^2$ (when $\sigma_y = 40$ kg/mm$^2$, $\sigma_y/E = 40/21,000$ (approximately 0.2%); therefore, a linear expansion of 0.4% is satisfactory for changing a weld zone at a tensile yield strength level to one at a compressive yield strength level). The prior art overlooks the fact that the remaining transformation expansion is not directly related to the stress, and becomes a plastic strain.

In another method, attention has been paid to the fact that the transformation expansion is not necessarily changed to a compressive elastic strain entirely, and a method can be considered by which the compressive elastic strain obtained by the transformation expansion is made as large as possible. When the compressive elastic strain obtained is large, the weld zone has a large chance to remain in a compressive stress state even in cases where the subsequent thermal contraction is large (that is, the Ms temperature is high).

Actually, when a steel material or weld metal is transformed from austenite (face-centered structure) into ferrite or martensite (body-centered structure), the volume is increased by about 9%. The increase signifies that the material expands by about 3% in terms of a linear expansion. It is seen, therefore, that about several tens of percent of a total expansion involved in the transformation is sufficient for allowing the material to reach a compressive stress state from a tensile stress state. The remainder of the transformation expansion is changed to a plastic strain which does not contribute to a stress. Accordingly, at least a half of the transformation expansion actually produced becomes a plastic strain. The phenomenon signifies that there remains a chance of increasing the amount of changing a transformation expansion to a compressive elastic strain by making the yield strength at the transformation starting temperature high compared with the conventional yield strength.

The present invention differs from the prior art in that it does not rely only on lowering the Ms temperature. In order to effectively utilize the transformation expansion compared with the prior art, namely, in order to change the transformation expansion to the compressive elastic strain as much as possible in the present invention, the yield strength of a weld metal and a steel material is newly controlled, and as a result the effect of decreasing the residual stress can be obtained even at a high Ms temperature where the effect cannot be obtained by the prior art.

The present inventors have found a mechanism of decreasing the residual stress by controlling the yield strength, and determined a practical Ms temperature range for decreasing the residual stress of a welded joint and a yield strength range at the Ms temperature, based on the mechanism. In the present invention, the Ms temperature range and the yield strength range of a weld metal and a steel material at the Ms temperature are restricted for the following reasons.

In the present invention, the Ms temperature is restricted to 200 to 350° C. Ordinary steel materials and weld metals show a Ms temperature of up to 500° C., and up to 450° C. in many cases. The Ms temperature depends on the chemical composition of a steel material or weld metal. For example, as seen in CCT Diagrams for Welding of Steels for Welded Structures published by the Iron and Steel Institute of Japan, when Ni is added in an amount of about 5% to a steel material, the Ms temperature can be lowered to about 350°0 C. However, even when Ni is added in an amount of at least 9%, the Ms temperature does not necessarily become lower than 200° C. That is, since those steel materials and weld metals which have a Ms temperature of less than 200° C. that the prior art requires are very restricted, lowering the Ms temperature to less than 200° C. is difficult to apply to practical materials.

In the present invention, the lower limit of the Ms temperature is defined to be 200° C. as a realizable value of practical materials. Even when the Ms temperature is higher than 350°0 C., the effect of decreasing a residual stress can be expected so long as the yield strength is sufficiently high. However, since an excessively high yield strength is also difficult to realize on practical materials, the upper limit of the Ms temperature is defined to be 350°0 C. In addition, a low Ms temperature is advantageous to decrease the residual stress, and it is preferably up to 300° C.

Next, in the present invention, the yield strength of the steel material and weld metal is restricted to 60 to 120 kg/mm². When the yield strength is less than 60 kg/mm², the Ms temperature must be lower than 200° C. in order to surely obtain the effect of decreasing the residual stress.

Accordingly, the yield strength of less than 60 kg/mm² is not practical as explained above. In addition, the yield strength is preferably at least 70 kg/mm². On the other hand, in order to obtain a yield strength exceeding 120 kg/mm², many special alloying elements must be added. The resultant material becomes costly, and the procedure is not practical.

Next, reasons for introducing a parameter Pa shown by the following formula and restricting the value will be explained:

$$Pa = C + Ni/12 + Cr/24 + Mo/19 \qquad (i)$$

The parameter Pa is calculated from the contents of C, Ni, Cr and Mo. The constituent elements function to improve the strength of a steel material or weld metal when added thereto, and lower the Ms temperature. In particular, C, Ni, Cr and Mo are most effective for lowering the Ms temperature. Although effective utilization of carbide-forming elements such as Ti, Nb and V can be considered from the standpoint of improving the strength, a serious problem about the welded joint characteristics unpreferably arises when Ti, Nb, V, and the like are added so that the Ms temperature is lowered sufficiently.

The effects of lowering the Ms temperature with C, Ni, Cr and Mo are not the same, and the effects of the respective elements are represented by relative ratios attached to the respective elements in the formula (i) as coefficients. The index Pa defined by the formula (i) represents the effect of lowering the Ms temperature by the four elements as a whole. The value of Pa must be adjusted to fall in a proper region. When Pa is too small, the effects of lowering the Ms temperature are small. In such a case, in order to lower the Ms temperature further, other elements must be added; therefore, ensuring good welded joint characteristics becomes difficult. On the other hand, when Pa is large, the effects of lowering the Ms temperature become large, and the effects of decreasing the residual stress become large. However, an excessively low Ms temperature results in low practicability as explained in the prior art. The present invention does not require a low Ms temperature as required by the prior art, and the yield strength must be increased in the present invention. For reasons as explained above, Pa is defined to be from at least 0.85 to up to 1.15.

Next, reasons for restricting the chemical composition of the steels for welded-structures (welding base materials) will be explained.

The composition series for obtaining a Ms temperature and a yield strength necessary for decreasing the residual stress in the weld zone is not necessarily single because there are a plurality of constituent elements such as Ni and Cr which can lower the Ms temperature. The steels for welded structures in the present invention can be classified into two composition series: a composition series in which Ni is mainly used as described in [3] to [4] mentioned above and a composition series in which Cr is mainly used as described in [5] to [6] mentioned above. The former is referred to as a Ni-alloyed steel for welded structures and the latter is referred to as a Cr-alloyed steel for welded structures hereinafter.

First, reasons for restricting the chemical composition of the Ni-alloyed steel for welded structures will be explained.

C functions to lower the Ms temperature of Fe when added thereto. However, since excessive addition of C causes problems such as weld cracking and deterioration of the toughness, the upper limit of the addition amount of C is defined to be 0.2%. However, when C is not added, martensite becomes difficult to form, and the residual stress must be decreased with other costly elements alone, which is not economical. The addition amount of C is restricted to at least 0.01% to utilize the low cost element C, and the value is determined as a minimum one from which an economic advantage can be derived.

Si is known as a deoxidizing element. First, as regards the lower limit of the addition amount of Si, addition of Si to some extent is desirable in the sense that the yield strength of the steel of the present invention is ensured. The lower limit of the addition amount 0.01% of Si in the base material is determined as a minimum value which causes the effect of ensuring the strength. On the other hand, excessive addition of Si causes many problems regarding ensuring the toughness of the base material. The upper limit of the addition amount 0.4% of Si is determined from the standpoint of ensuring the base material toughness.

Mn is known as an element for increasing the strength of the steel. Mn is, therefore, an element which should be effectively utilized from the standpoint of ensuring the yield strength during the transformation expansion, which is a mechanism of decreasing the residual stress in the present invention. The lower limit of the addition amount of 0.2% of Mn is determined as a minimum value from which the effect of ensuring the strength can be derived. On the other hand, since excessive addition of Mn causes deterioration of the base material toughness, the upper limit of the addition amount of Mn is defined to be 1.5%.

P and S are impurities in the present invention. However, when such elements are present in the base material and weld metal in large amounts, the toughness is deteriorated. Accordingly, the upper limit of the addition amounts of P and S are defined to be 0.03% and 0.02%, respectively.

Ni as a simple substance is a metal having an austenitic structure, namely, a face-centered structure, and it is an element which makes the state of austenite more stable when added to a steel material. Iron itself has an austenitic structure in a high temperature region, and a ferritic structure, namely, a body-centered structure in a low temperature region. Since addition of Ni makes the face-centered structure of a steel in a high temperature region more stable, the steel has a face-centered structure in a lower temperature region than in cases where Ni is not added, which signifies that the temperature of transformation into a body-centered structure lowers. The lower limit of the addition amount of 8% of Ni is determined in the sense that the addition amount is a minimum addition amount of Ni from which the effect of decreasing the residual stress appears. The upper limit of the addition amount of 12% of Ni is determined for the following reasons: addition of Ni in an amount exceeding the upper limit does not bring about a significant effect from the standpoint of decreasing the residual stress; and moreover the addition has the economic disadvantage that Ni thus used is costly.

Nb combines with C in the base material to form carbides. Nb carbides in a small amount function to increase the strength of the base material. Accordingly, the economic advantage of their effective utilization is significant. Moreover, the advantage is significant in the sense that the yield strength is increased at the Ms temperature, which is a technology of decreasing the residual stress in the present invention. On the other hand, however, since the formation of the carbides in an excessive amount produces deterioration of the toughness, the upper limit of the addition amount is naturally determined. The lower limit of the addition amount 0.01% of Nb is determined as a minimum value from which the effect of increasing the strength can be expected. The upper limit of the addition amount 0.3% is determined as a value which does not cause a decrease in the reliability of the weld zone as a result of the deterioration of the toughness.

V is an element which acts similarly to Nb. However, V differs from Nb in that V must be added in an amount larger than that of Nb when the same precipitation effect is expected. The lower limit of the addition amount 0.05% of V is determined as a minimum value from which precipitation hardening caused by addition of V can be expected. The upper limit of the addition amount is determined to be 0.5% because precipitation hardening becomes so significant that deterioration of the toughness is caused when V is added in an amount exceeding the upper limit.

Ti forms carbides and causes precipitation hardening similarly to Nb and V. However, as V differs from Nb in precipitation hardening, so Ti also differs from Nb and V therein. The addition amount of Ti is, therefore, determined differently from those of Nb and V. The lower limit of the addition amount 0.005% of Ti is determined as a minimum value from which the effects can be expected, and the upper limit of the addition amount 0.3% is determined, from consideration of deterioration of the toughness.

Cr differs from Ni in that Cr is a ferrite former. However, when Cr is added to iron, the iron is ferritic in a high temperature region, forms austenite in a medium temperature region, and forms ferrite again at lower temperatures. As regards the welding zone, ferrite on the low temperature side is generally not obtained due to the thermal history made by the welding heat input, and martensite is obtained, which signifies that the advantage of adding Cr is derived from an increase in the hardenability. That is, the features of a martensite transformation brought about by Cr addition are the following two points: a ferrite transformation does not take place due to an increase in the hardenability; and the Ms temperature itself lowers. Moreover, Cr is a precipitating element, and an increase in the strength of the steel can be expected from the addition thereof; therefore, effective utilization thereof is desirable. The lower limit of the addition amount 0.1% of Cr is defined as an amount with which a transformation expansion for decreasing the residual stress can be effectively utilized while both of the effects are being industrially achieved. The upper limit of the addition amount 3.0% of Cr is determined for the following reasons. The Ms temperature of the Ni-alloyed steel for welded structures is already lowered by addition of Ni; addition of Cr in an amount exceeding the upper limit does not make the effect more significant; and the economic disadvantage becomes great.

Mo is also an element which can be expected to precipitation harden the steel similarly to Nb, V and Ti. In order to obtain the effect comparable to that of Nb, V or Ti, Mo must be added in an amount exceeding the addition amount of Nb, V or Ti. The lower limit of the addition amount 0.1% of Mo is determined as a minimum value from which an increase in the yield strength caused by precipitation hardening can be expected. Moreover, the upper limit of the addition amount 3.0% is determined from consideration of deterioration of the toughness similarly to Nb, V and Ti.

Next, reasons for restricting the chemical composition of the Cr-alloyed steel for welded structures will be explained.

C functions to lower the Ms temperature of Fe when added thereto. However, since excessive addition of C causes problems such as weld cracking and deterioration of the toughness, the upper limit of the addition amount of C is defined to be 0.05%. However, when C is not added, martensite becomes difficult to form, and the residual stress must be decreased with other costly elements alone, which is not economical. The addition amount of C is restricted to at least 0.005% to utilize the low cost element C, and the value is determined as a minimum one from which an economic advantage can be derived.

Si is known as a deoxidizing element. Addition of Si to some extent is desirable in the sense that the yield strength of the steel of the present invention is ensured. The lower limit of the addition amount 0.05% of Si in the base material is determined as a minimum value which causes the effect of ensuring the strength. The upper limit of the addition amount 0.5% of Si is determined from the standpoint of ensuring the base material toughness.

Mn is known as an element for increasing the strength of the steel. Mn is, therefore, an element which should be effectively utilized from the standpoint of ensuring the yield strength during the transformation expansion, which is a mechanism of decreasing the residual stress in the present invention. The lower limit of the addition amount 0.4% of Mn is determined as a minimum value from which the effect of ensuring the strength can be derived. On the other hand, since excessive addition of Mn causes deterioration of the toughness of the base material and weld metal, the upper limit of the addition amount of Mn is defined to be 2.5%.

P and S are impurities in the present invention. However, when such elements are present in the base material and weld metal in large amounts, the toughness is deteriorated. Accordingly, the upper limit of the addition amounts of P and S are defined to be 0.03% and 0.02%, respectively.

Ni as a simple substance is a metal having an austenitic structure, namely, a face-centered structure, and it is an element which makes the state of austenite more stable when added to a steel material. Iron itself has an austenitic structure in a high temperature region, and a ferritic structure, namely, a body-centered structure in a low temperature region. Since addition of Ni makes the face-centered structure of a steel in a high temperature region more stable, the steel has a face-centered structure in a lower temperature region than in cases where Ni is not added, which signifies that the temperature of transformation into a body-centered structure lowers. Moreover, Ni has the effect of improving the toughness of the base material and weld metal when added. The lower limit of the addition amount of 3% of Ni is determined in the sense that the addition amount is a minimum addition amount of Ni from which the effect of decreasing the residual stress appears and from the standpoint of ensuring the toughness. The upper limit of the addition amount of 7% of Ni is determined for the following reasons: since the Ms temperature is lowered to some extent as a result of adding Cr in the Cr-alloyed steel in the present invention, addition of Ni in an amount exceeding the upper limit does not bring about a significant effect from the standpoint of decreasing the residual stress; moreover the further addition has the economic disadvantage that Ni thus used is costly.

Cr differs from Ni in that Cr is a ferrite former. However, when Cr is added to iron, the iron is ferritic in a high temperature region, forms austenite in a medium temperature region, and forms ferrite again at lower temperatures. As regards the welding zone, ferrite on the low temperature side is not obtained generally due to the thermal history made by the welding heat input, and martensite is obtained, which signifies that the advantage of adding Cr is derived from an increase in the hardenability. That is, the features of a martensite transformation brought about by Cr addition are the following two points: a ferrite transformation does not take place due to an increase in the hardenability; and the Ms temperature itself lowers. The lower limit of the addition amount 10% of Cr is determined as an amount which effectively utilizes the transformation expansion for decreasing the residual stress while both of the effects are being achieved. The upper limit of the addition amount 15% of Cr is determined because even when Cr in an amount exceeding the upper limit is added, the addition effect is not increased and the economical disadvantage becomes significant.

Nb combines with C in the base material and weld metal to form carbides. Nb carbides in a small amount function to increase the strength of the base material and weld metal. Accordingly, the economic advantage of their effective utilization is significant. Moreover, the advantage is significant in the sense that the yield strength is increased at the Ms temperature, which is a technology of decreasing the residual stress in the present invention. On the other hand, however, since the formation of the carbides in an excessive amount produces deterioration of the toughness, the upper limit of the addition amount is naturally determined. The lower limit of the addition amount 0.005% of Nb is naturally determined as a minimum value from which the effect of increasing the strength can be expected. The upper limit of the addition amount 0.3% is determined as a value which does not cause a decrease in the reliability of the weld zone as a result of the deterioration of the toughness.

V is an element which acts similarly to Nb. However, V differs from Nb in that V must be added in an amount larger than that of Nb when the same precipitation effect is expected. The lower limit of the addition amount 0.05% of V is determined as a minimum value from which precipitation hardening caused by addition of V can be expected. The upper limit of the addition amount is determined to be 0.5% because precipitation hardening becomes so significant that deterioration of the toughness is caused when V is added in an amount exceeding the upper limit.

Ti forms carbides and causes precipitation hardening similarly to Nb and V. However; as V differs from Nb in precipitation hardening, so Ti also differs from Nb and V therein. The addition amount of Ti is, therefore, determined differently from those of Nb and V. The lower limit of the addition amount of 0.005% of Ti is determined as a minimum value from which the effects can be expected, and the upper limit of the addition amount of 0.3% is determined from consideration of deterioration of the toughness.

Mo is also an element which can be expected to precipitation harden the steel similarly to Nb, V and Ti. In order to obtain the effect comparable to that of Nb, V or Ti, Mo must be added in an amount exceeding the addition amount of Nb, V or Ti. The lower limit of the addition amount of 0.1% of Mo is determined as a minimum value from which an increase in the yield strength caused by precipitation hardening can be expected. Moreover, the upper limit of the addition amount of 3.0% is determined from consideration of deterioration of the toughness similarly to Nb, V and Ti.

N is an element which is known as an austenite former. Since martensite tends to be obtained easily when N is added to the steel, N must be added at least in a minimum amount. The lower limit of the addition amount 0.001% is determined as a minimum value for obtaining a low Ms temperature similarly to C. However, excessive addition of N forms nitrides, and causes problems regarding deterioration of the toughness and the ductility; therefore, the upper limit is determined to be 0.05%.

C and N are similar in their functions, for example, C and N form carbides and nitrides, respectively, and they are austenite formers. Accordingly, the total amount, namely, the upper and lower limit addition amounts of C plus N must be determined. The lower limit of the addition amount 0.001% of C plus N is determined as a minimum value which makes martensite easily obtainable, and which lowers the Ms temperature. Moreover, the upper limit of the addition amount 0.06% of C plus N is determined as a limit value which does not cause problems regarding deterioration of the toughness and the ductility due to formation of carbides and nitrides.

Next, reasons for restricting the chemical composition of the welding wires of the present invention will be explained.

The composition series for obtaining the Ms temperature and the yield strength, as mentioned above, of welding wires is not necessarily single similarly to the steels for welded structures of the present invention. The welding wires in the present invention can be classified into two composition series: a composition series in which Ni is mainly used as described in [9] to [10] mentioned above and a composition series in which Cr is mainly used as described in [11] to [12] mentioned above. The former is referred to as a Ni-alloyed welding wire, and the latter is referred to as a Cr-alloyed welding wire.

First, reasons for restricting the chemical composition of the Ni-alloyed welding wire will be explained.

C functions to lower the Ms temperature of Fe when added thereto. However, since an excessive addition of C causes problems such as deterioration of the toughness of the weld metal and weld cracking, the upper limit of the addition amount of C is defined to be 0.2%. However, when C is not added, martensite becomes difficult to form, and the residual stress must be decreased with other costly elements alone, which is not economical. The addition amount of C is restricted to at least 0.01% to utilize the low cost element C, and the value is determined as a minimum one from which an economic advantage can be derived. In addition, the upper limit of C is preferably determined to be 0.15% in view of weld cracking.

Si is known as a deoxidizing element. Si has the effect of lowering the oxygen level of the weld metal. Particularly in welding procedures, since there is the danger of air being mixed during welding, adjusting the Si amount to an appropriate value is extremely important. First, as regards the lower limit of Si, when the amount of Si added to the welding wire is less than 0.1%, the deoxidizing effect is lessened and the oxygen content level in the weld metal becomes so high that there is the danger of causing deterioration of the mechanical properties and toughness in particular. Accordingly, the lower limit of the amount of Si in the welding wire is defined to be 0.1%. On the other hand, since excessive addition of Si causes deterioration of the toughness, the upper limit of the amount of Si is defined to be 0.5%.

Mn is known as an element for increasing the strength of the steel. Mn is, therefore, an element which should be effectively utilized from the standpoint of ensuring the yield strength during the transformation expansion, which is a mechanism of decreasing the residual stress in the present invention. The lower limit of the addition amount 0.01% of Mn is determined as a minimum value from which the effect of ensuring the strength can be derived. On the other hand, since excessive addition of Mn causes deterioration of the toughness of the base material and weld metal, the upper limit of the addition amount of Mn is defined to be 1.5%.

P and S are impurities in the present invention. However, when such elements are present in the base material and weld metal in large amounts, the toughness is deteriorated. Accordingly, the upper limit of the addition amounts of P and S are defined to be 0.03% and 0.02%, respectively.

Ni as a simple substance is a metal having an austenitic structure, namely, a face-centered structure, and it is an element which makes the state of austenite more stable when added to a welding wire. Iron itself has an austenitic structure in a high temperature region, and a ferritic structure, namely, a body-centered structure in a low temperature region. Since addition of Ni makes the face-centered structure of iron in a high temperature region more stable, the iron has a face-centered structure in a lower temperature region than in cases where Ni is not added, which signifies that the temperature of transformation into a body-centered structure lowers. The lower limit of the addition amount of 8% of Ni is determined in the sense that the addition amount is a minimum addition amount of Ni from which the effect of decreasing the residual stress appears. The upper limit of the addition amount 12% of Ni is determined for the following reasons: addition of Ni in an amount exceeding the upper limit does not bring about a significant effect from the standpoint of decreasing the residual stress; and moreover the addition has the economic disadvantage that Ni thus used is costly.

When the welding wire is coated with Cu, Cu has the effect of improving the conductivity thereof. Cu is, therefore, an element which is effective in improving the welding operation. Moreover, since Cu is an element which improves the hardenability of the weld metal, it is expected to have the effect of promoting the martensite transformation. The lower limit of the addition amount 0.05% of Cu is determined as a minimum value necessary for improving the operation and promoting the martensite transformation. However, excessive addition of Cu is not only ineffective in improving the operation but also industrially unpreferable because the production cost of the welding wire is increased. The upper limit of the addition amount of Cu is determined to be 0.4% for reasons as mentioned above.

Nb combines with C in the weld metal to form carbides. Nb carbides in a small amount function to increase the strength of the base material and weld metal. Accordingly, the economic advantage of their effective utilization is significant. Moreover, the advantage is significant in the sense that the yield strength is increased at the Ms temperature, which is a technology of decreasing the residual stress in the present invention. On the other hand, however, since the formation of the carbides in an excessive amount produces deterioration of the toughness, the upper limit of the addition amount is naturally determined. The lower limit of the addition amount 0.01% of Nb is naturally determined as a minimum value from which the effect of increasing the strength can be expected. The upper limit of the addition amount 0.4% is determined as a value which does not cause a decrease in the reliability of the weld zone as a result of the deterioration of the toughness.

V is an element which acts similarly to Nb. However, V differs from Nb in that V must be added in an amount larger than that of Nb when the same precipitation effect is expected. The lower limit of the addition amount 0.3% of V is determined as a minimum value from which precipitation hardening caused by addition of V can be expected. The upper limit of the addition amount is determined to be 1.0% because precipitation hardening becomes so significant that deterioration of the toughness is caused when V is added in an amount exceeding the upper limit.

Ti forms carbides and causes precipitation hardening similarly to Nb and V. However, as V differs from Nb in precipitation hardening, so Ti also differs from Nb and V therein. The addition amount of Ti is, therefore, determined differently from those of Nb and V. The lower limit of the addition amount 0.01% of Ti is determined as a minimum value from which the effects can be expected, and the upper limit of the addition amount 0.4% is determined from consideration of the deterioration of the toughness.

Cr is a precipitation hardening element similarly to Nb, V and Ti. Moreover, since Cr also has the effect of lowering the Ms temperature, it is an element which should be effectively utilized. However, since lowering the Ms temperature of the welding wire in the present invention is achieved principally by addition of Ni, the addition amount of Cr should be decreased as compared with Ni. Excessive addition of Cr does not necessarily improve the effect of lowering the residual stress, and Cr is costly. Therefore, the excessive addition is not preferred industrially. The lower limit of the addition amount 0.1% of Cr is determined as a minimum value from which the effect of decreasing the residual stress can be derived. The upper limit of the addition amount 3.0% of Cr in the Ni-alloyed wire is determined for the following reasons: further addition of Cr does not change much the effect of decreasing the residual stress because the Ms temperature is already lowered by addition of Ni and the strength is ensured by other precipitation elements; further addition of Cr makes deterioration of the toughness significant.

Mo is an element which has the same effects as Cr. However, Mo is an element from which precipitation hardening can be expected more than Cr. The addition amount range of Mo is determined to be narrower than that of Cr. The lower limit of the addition amount 0.1% of Mo is determined as a minimum value from which the effects of Mo addition can be expected. The upper limit of the addition amount 3.0% of Mo is determined because addition of Mo in an amount exceeding the upper limit makes the weld metal excessively hard and deterioration of the toughness significant.

Co differs from Ti in that Co is not an element which strongly produces precipitation hardening. However, Co is an element preferred to Ni from the standpoint of increasing the strength and ensuring the toughness while an increase in the strength is being expected, by the addition of Co. Co is, therefore, an element which should be effectively utilized. However, since Ni is added to the welding wire to ensure a low Ms temperature to such a degree that the effect of decreasing the residual stress can be expected, the lower limit of the addition amount 0.1% of Co is determined as a minimum value from which the effects of adding Co can be expected. On the other hand, since excessive addition of Co results in excessively increasing the strength and deteriorating the toughness, the upper limit of the addition amount is defined to be 2.0%.

Next, reasons for restricting the chemical composition of the Cr-alloyed welding wire will be explained.

C functions to lower the Ms temperature of Fe when added thereto. However, since excessive addition of C causes problems such as weld cracking and deterioration of the toughness of the weld metal, the upper limit of the addition amount of C is defined to be 0.05%. However, when C is not added, it becomes difficult to form martensite, and the residual stress must be decreased with other costly elements alone which is not economical. The addition amount of C is restricted to at least 0.005% to utilize the low cost element C, and the value is determined as a minimum one from which an economic advantage can be derived.

Si is known as a deoxidizing element. Si has the effect of lowering the oxygen level of the weld metal and steel material. Particularly in weld metal, since there is the danger of air being mixed during welding, adjusting the Si amount to an appropriate value is extremely important. First, as regards the lower limit of Si, when the amount of Si added to the welding wire is less than 0.1%, the deoxidizing effect is lessened and the oxygen content level in the weld metal becomes so high that there is the danger of causing deterioration of the mechanical properties, toughness in particular. Accordingly, the lower limit of the amount of Si in the welding wire is defined to be 0.1%. On the other hand, since excessive addition of Si causes deterioration of the toughness, the upper limit of the amount of Si is defined to be 0.7%.

Mn is known as an element for increasing the strength of the steel. Mn is, therefore, an element which should be effectively utilized from the standpoint of ensuring the yield strength during the transformation expansion, which is a mechanism of decreasing the residual stress in the present invention. The lower limit of the addition amount 0.4% of Mn is determined as a minimum value from which the effect of ensuring the strength can be derived. On the other hand, since excessive addition of Mn causes deterioration of the toughness of the base material and weld metal, the upper limit of the addition amount of Mn is defined to be 2.5%.

P and S are impurities in the present invention. However, when such elements are present in the base material and weld metal in large amounts, the toughness is deteriorated. Accordingly, the upper limit of the addition amounts of P and S are defined to be 0.03% and 0.02%, respectively.

Ni as a simple substance is a metal having an austenitic structure, namely, a face-centered structure. Iron itself has an austenitic structure in a high temperature region, and a ferritic structure, namely, a body-centered structure in a low temperature region. Since addition of Ni makes the face-centered structure of a steel in a high temperature region more stable, the steel has a face-centered structure in a lower temperature region than in cases where Ni is not added, which signifies that the temperature of transformation into a body-centered structure lowers. Moreover, Ni has the effect of improving the toughness of the weld metal when added. The lower limit of the addition amount 4% of Ni in the Cr-alloyed welding wire is determined in the sense that the addition amount is a minimum addition amount of Ni from which the effect of decreasing the residual stress appears and from the standpoint of ensuring the toughness. The upper limit of the addition amount 8% of Ni is determined for the following reasons: the Ms temperature is lowered to some extent as a result of adding Cr (Cr addition will be described below) in the Cr-alloyed welding wire, and addition of Ni in an amount exceeding the upper limit does not bring about a significant effect from the standpoint of decreasing the residual stress; moreover the further addition has the economic disadvantage that Ni thus used becomes costly.

Cr differs from Ni in that Cr is a ferrite former. However, when Cr is added to iron, the iron is ferritic in a high temperature region, forms austenite in a medium temperature region, and forms ferrite again at lower temperatures. As regards the welding zone, ferrite on the low temperature side is not obtained generally due to the thermal history made by the welding heat input, and martensite is obtained, which signifies that the advantage of adding Cr is derived from an increase in the hardenability. That is, the features of a martensite transformation brought about by Cr addition are the following two points: a ferrite transformation does not take place due to an increase in the hardenability; and the Ms temperature itself lowers. The lower limit of the addition amount 10% of Cr is determined as an amount which effectively utilizes the transformation expansion for decreasing the residual stress while both of the effects are being achieved. The upper limit of the addition amount 15% of Cr is determined because even when Cr in an amount exceeding the upper limit is added, the addition effect is not increased and the economical disadvantage becomes significant.

When the welding wire is coated with Cu, Cu has the effect of improving the conductivity thereof. Cu is, therefore, an element which is effective in improving the welding operation. Moreover, since Cu is an element which improves the hardenability of the weld metal, it is expected to have the effect of promoting the martensite transformation. The lower limit of the addition amount 0.05% of Cu is determined as a minimum value necessary for improving the operation and promoting the martensite transformation. However, excessive addition of Cu is not only ineffective in improving the operation but also industrially unpreferable because the production cost of the welding wire is increased. The upper limit of the addition amount of Cu is determined to be 0.4% for reasons as mentioned above.

Nb combines with C in the weld metal to form carbides. Nb carbides in a small amount function to increase the strength of the weld metal. Accordingly, the economic advantage of their effective utilization is significant. Moreover, the advantage is significant in the sense that the yield strength is increased at the Ms temperature, which is a technology of decreasing the residual stress in the present invention. On the other hand, however, since the formation of the carbides in an excessive amount produces deterioration of the toughness, the upper limit of the addition amount is naturally determined. The lower limit of the addition amount 0.005% of Nb is determined as a minimum value from which the effect of increasing the strength can be expected. The upper limit of the addition amount 0.3% is determined as a value which does not cause a decrease in the reliability of the weld zone as a result of the deterioration of the toughness.

V is an element which acts similarly to Nb. However, V differs from Nb in that V must be added in an amount larger than that of Nb when the same precipitation effect is expected. The lower limit of the addition amount 0.05% of V is determined as a minimum value from which precipitation hardening caused by addition of V can be expected. The upper limit of the addition amount is determined to be 0.5% because precipitation hardening becomes so significant that deterioration of the toughness is caused when V is added in an amount exceeding the upper limit.

Ti forms carbides and causes precipitation hardening similarly to Nb and V. However, as V differs from Nb in precipitation hardening, so Ti also differs from Nb and V therein. The addition amount of Ti is, therefore, determined differently from those of Nb and V. The lower limit of the addition amount 0.005% of Ti is determined as a minimum value from which the effects can be expected and the upper limit of the addition amount 0.3% is determined from consideration of deterioration of the toughness.

Mo is also an element which can be expected to precipitation harden the steel similarly to Nb, V and Ti. In order to obtain the effect comparable to that of Nb, V or Ti, Mo must be added in an amount exceeding the addition amount of Nb, V or Ti. The lower limit of the addition amount 0.1% of Mo is determined as a minimum value from which an increase in the yield strength caused by precipitation hardening can be expected. Moreover, the upper limit of the addition amount 2.0% is determined from consideration of deterioration of the toughness similarly to Nb, V and Ti.

N is an element which is known as an austenite former. Since martensite tends to be obtained easily when N is added to the steel, N must be added at least in a minimum amount. The lower limit of the addition amount 0.001% is determined as a minimum value for obtaining a low Ms temperature similarly to C. However, excessive addition of N forms nitrides, and causes problems about deterioration of the toughness and the ductility; therefore, the upper limit is determined to be 0.05%.

C and N are similar in their functions, for example, C and N form carbides and nitrides, respectively, and they are austenite formers. Accordingly, the total amount, namely, the upper and lower limit addition amounts of C plus N must be determined. The lower limit of the addition amount 0.001% of C plus N is determined as a minimum value which makes martensite easily obtainable, and which lowers the Ms temperature. Moreover, the upper limit of the addition amount 0.06% of C plus N is determined as a limit value which does not cause problems about deterioration of the toughness and the ductility due to formation of carbides and nitrides.

Next, the fundamental idea of the second aspect of the present invention will be explained.

First, when a transformation expansion is produced at a sufficiently low temperature in a multipass welded joint, examination of the residual stress of each of the weld-beads sometimes shows a significantly high stress value for reasons as explained below.

In conducting multipass welding, the residual stress of a weld bead is assumed to be compressive. When a new weld bead is formed adjacently to the weld bead, the thermal expansion of the new weld bead acts to pull weld beads having been formed. The phenomenon signifies that even when the residual stress of a weld bead is decreased, the transformation expansion of the subsequent weld bead formed by subsequent welding acts to produce a tensile residual stress in the prior weld bead. After all, it is the final weld bead in the final layer alone that shows a decrease in the residual stress. A large tensile residual stress remains in the other weld beads present in the surface layer. However, when a material which does not produce a low temperature transformation expansion is used in the final weld bead, the residual stress of the final weld bead cannot be decreased naturally.

As explained above, when a plurality of weld beads are formed on the surface, the beads interact each other. As a result, there is no other way but to conclude that entirely decreasing the weld residual stress on the surface of the weld metal is difficult. The situation is the same even when the material in the first aspect of the present invention is employed. It is, therefore, understood that the technology of decreasing the residual stress of a weld metal by improving a welding material is not yet a sufficiently completed one.

It can be seen from the consideration mentioned above that the residual stress at least on the surface of a weld metal portion can be decreased when the final layer can be finished with one bead. However, when the final layer is finished with one bead, the welding heat input often, becomes excessive except for cases where the groove can be narrowed sufficiently. As a result, even when the residual stress is decreased, desired results cannot necessarily be obtained from the standpoint of improving a welded joint, consequently from the standpoint of ensuring the reliability of welded structures.

The present inventors have intensively analyzed the problems the prior art has, and confirmed the effects of TIG remelt-run welding. TIG remelt-run welding solves the former problem that when multipass welding is conducted as some weld beads on the surface do not necessarily show a decrease in the residual stress even if they experience a low temperature transformation expansion. That is, the residual stress is redistributed by remelting the surface once with TIG remelt-run welding, and the same effects are produced as in cases where a weld metal surface is uniformly melted and new weld beads are formed. Moreover, the whole surface is melted once, and subsequently subjected to a cooling step.

Furthermore, since there is no subsequent welding, the problem arising from the prior art, namely, the problem that even when the residual stress of a bead is decreased, a high tensile residual stress is generated again by the subsequent weld bead does not arise. Furthermore, if the weld beads are locally examined, the TIG remelt-run welding has the advantage of decreasing stress-concentrated portions on the surface of the weld beads. As explained above, the use of TIG remelt-run welding has a significant economical advantage in view of improving the properties of a welded joint.

Next, reasons for restricting the chemical composition of the welding wire will be explained.

First, reasons for restricting the Ms temperature will be explained.

When the final layer has one bead, the welding wire must be able to form a weld metal having a low Ms temperature to such a degree that a weld residual stress can be expected. In order to meet the requirement, the Ms temperature must be from at least 150° C. to up to 300° C. The upper limit of the Ms temperature is determined to be 300° C. for reasons as explained below. In cases where the Ms temperature is higher than 300° C., even when the weld metal transforms into martensite and comes to have a compressive residual stress at the temperature, namely, the Ms temperature, due to the transformation expansion, the weld metal comes to have a high tensile stress again due to thermal contraction in the subsequent course of cooling to room temperature. The thermal contraction amount subsequent to the transformation is proportional to a difference between room temperature and the Ms temperature. Accordingly, when the Ms temperature becomes high to some degree, the thermal contraction amount becomes large, and the stress state at room temperature, namely, decreasing the residual stress becomes impossible. The upper limit of the Ms temperature of 300° C. is determined because decreasing the residual stress by the use of the welding material becomes impossible at a Ms temperature exceeding the upper limit.

In order to make the thermal contraction subsequent to the martensite transformation small, a lower Ms temperature is thought to be more advantageous so long as the Ms temperature is at least room temperature. However, when the Ms temperature of an actual weld metal is too low, it cannot always be concluded that the entire weld metal transforms even if the Ms temperature is at least room temperature. A higher content of retained austenite signifies a smaller transformation expansion amount. Since the present invention utilizes the transformation expansion of a weld metal for the purpose of decreasing the residual stress, the effectiveness of the present invention cannot be displayed unless the martensite transformation is surely brought about. The lower limit of the Ms temperature is determined to be 150° C. in order to inhibit the formation of retained austenite and surely bring about the martensite transformation.

As explained above, the chemical composition of the welding wire should be determined so that the Ms temperature falls in a given range. However, there is the problem that in order to utilize the transformation expansion surely and effectively, the weld metal strength during transformation must be ensured to some extent as explained below. The weld metal strength usually tends to lower as the temperature rises. Accordingly, for example, when the weld metal strength becomes extremely low during the transformation expansion, the transformation expansion itself becomes a plastic strain which is not related to a residual stress substantially, and a tensile stress alone is introduced by the subsequent thermal contraction and strength recovery. Accordingly, the chemical composition of the welding wire must be restricted not only from the standpoint of ensuring a low Ms temperature but also from the standpoint of ensuring strength.

Meticulous precautions must be taken for selecting the chemical composition of a welding wire capable of forming a weld metal having such properties.

Next, reasons for restricting the range of the following parameter Pa will be explained. The significance of the following formula (i) itself is as described above.

$$Pa = C + Ni/12 + Cr/24 + Mo/19 \quad (i)$$

When Pa is too small, lowering the Ms temperature is difficult. Conversely, a larger value of Pa signifies that the Ms temperature lowers more and the residual stress is decreased. However, since austenite may be retained in the weld metal, it is difficult to conclude that a large value of Pa is preferable from the standpoint of ensuring welded joint characteristics. Accordingly, Pa is defined to be from at least 0.95 to up to 1.30.

Such a composition series is not necessarily only one kind because there are a plurality of constituent elements such as Ni and Cr which can lower the Ms temperature. Steels for welded structures in the present invention can be classified into a composition series which is described in [15] to [16] mentioned above and in which Ni is principally used and a composition series which is described in [17] to [18] mentioned above and in which Cr is principally used. The former will be referred to as a Ni-alloyed welding wire and the latter will be referred to as a Cr-alloyed welding wire. Reasons for restricting each of the elements will be explained in detail.

First, reasons for restricting the chemical composition of the Ni-alloyed welding wire will be explained.

C functions to lower the Ms temperature of Fe when added thereto. However, since excessive addition of C causes problems such as deterioration of the toughness of the weld metal and weld cracking, the upper limit of the addition amount of C is defined to be 0.2%. However, when C is not added, martensite becomes difficult to form, and the residual stress must be decreased with other costly elements alone, which is not economical. The addition amount of C is restricted to at least 0.01% to utilize the low cost element C, and the value is determined as a minimum one from which an economic advantage can be derived. In addition, the upper limit of C is preferably determined to be 0.15% in view of weld cracking.

Si is known as a deoxidizing element. Si has the effect of lowering the oxygen level of the weld metal. Particularly in welding procedures, since there is the danger of air being mixed during welding, adjusting the Si amount to an appropriate value is extremely important. First, as regards the lower limit of Si, when the amount of Si added to the welding wire is less than 0.1%, the deoxidizing effect is lessened and the oxygen content level in the weld metal becomes so high that there is the danger of causing deterioration of the mechanical properties, toughness in particular. Accordingly, the lower limit of the amount of Si in the welding wire is defined to be 0.1%. On the other hand, since excessive addition of Si causes deterioration of the toughness, the upper limit of the amount of Si is defined to be 0.5%.

Mn is known as an element for increasing the strength of the steel. Mn is, therefore, an element which should be effectively utilized from the standpoint of ensuring the yield strength during the transformation expansion, which is a mechanism of decreasing the residual stress in the present invention. The lower limit of the addition amount 0.01% of Mn is determined as a minimum value from which the effect of ensuring the strength can be derived. On the other hand, since excessive addition of Mn causes deterioration of the toughness of the base material and weld metal, the upper limit of the addition amount of Mn is defined to be 1.5%.

P and S are impurities in the present invention. However, when such elements are present in the base material and weld metal in large amounts, the toughness is deteriorated. Accordingly, the upper limit of the addition amounts of P and S are defined to be 0.03% and 0.02%, respectively.

Ni as a simple substance is a metal having an austenitic structure, namely, a face-centered structure, and it is an element which makes the state of austenite more stable when added to a welding wire. Iron itself has an austenitic structure in a high temperature region, and a ferritic structure, namely, a body-centered structure in a low temperature region. Since addition of Ni makes the face-centered structure of iron in a high temperature region more stable, the iron has a face-centered structure in a lower temperature region than in cases where Ni is not added, which signifies that the temperature of transformation into a body-centered structure lowers. The lower limit of the addition amount 8% of Ni is determined in the sense that the addition amount is a minimum addition amount of Ni from which the effect of decreasing the residual stress appears. The upper limit of the addition amount 12% of Ni is determined for the following reasons: addition of Ni in an amount exceeding the upper limit does not bring about a significant effect from the standpoint of decreasing the residual stress; and moreover the addition has the economic disadvantage that Ni thus used is costly.

When the welding wire is coated with Cu, Cu has the effect of improving the conductivity thereof. Cu is, therefore, an element which is effective in improving the welding operation. Moreover, since Cu is an element which improves the hardenability of the weld metal, it is expected to have the effect of promoting the martensite transformation. The lower limit of the addition amount 0.05% of Cu is determined as a minimum value necessary for improving the operation and promoting the martensite transformation. However, excessive addition of Cu is not only ineffective in improving the operation but also industrially unpreferable because the production cost of the welding wire is increased. The upper limit of the addition amount of Cu is determined to be 0.4% for reasons as mentioned above.

Nb combines with C in the weld metal to form carbides. Nb carbides in a small amount function to increase the strength of the base material and weld metal. Accordingly, the economic advantage of their effective utilization is significant. Moreover, the advantage is significant in the sense that the yield strength is increased at the Ms temperature, which is a technology of decreasing the residual stress in the present invention. On the other hand, however, since the formation of the carbides in an excessive amount produces deterioration of the toughness, the upper limit of the addition amount is naturally determined. The lower limit of the addition amount 0.01% of Nb is naturally determined as a minimum value from which the effect of increasing the strength can be expected. The upper limit of the addition amount 0.4% is determined as a value which does not cause a decrease in the reliability of the weld zone as a result of the deterioration of the toughness.

V is an element which acts similarly to Nb. However, V differs from Nb in that V must be added in an amount larger than that of Nb when the same precipitation effect is expected. The lower limit of the addition amount 0.3% of V is determined as a minimum value from which precipitation hardening caused by addition of V can be expected. The upper limit of the addition amount is determined to be 1.0% because precipitation hardening becomes so significant that deterioration of the toughness is caused when V is added in an amount exceeding the upper limit.

Ti forms carbides and causes precipitation hardening similarly to Nb and V. However, as V differs from Nb in precipitation hardening, so Ti also differs from Nb and V therein. The addition amount of Ti is, therefore, determined differently from those of Nb and V. The lower limit of the addition amount 0.01% of Ti is determined as a minimum value from which the effects can be expected, and the upper limit of the addition amount 0.4% is determined, from consideration of deterioration of the toughness.

Cr is a precipitation hardening element similarly to Nb, V and Ti. Moreover, since Cr also has the effect of lowering the Ms temperature, it is an element which should be effectively utilized. However, since lowering the Ms temperature of the welding wire in the present invention is achieved principally by addition of Ni, the addition amount of Cr should be decreased as compared with Ni. Excessive addition of Cr does not necessarily improve the effect of lowering the residual stress, and Cr is costly. Therefore, the excessive addition is not preferred industrially. The lower limit of the addition amount 0.1% of Cr is determined as a minimum value from which the effect of decreasing the residual stress can be derived. The upper limit of the addition amount 3.0% of Cr in the Ni-alloyed wire is determined for the following reasons: further addition of Cr does not much change the effect of decreasing the residual stress because the Ms temperature is already lowered by addition of Ni and the strength is ensured by other precipitation elements; further addition of Cr makes deterioration of the toughness significant.

Mo is an element which has the same effects as Cr. However, Mo is an element from which precipitation hardening can be expected more than Cr. The addition amount range of Mo is determined to be narrower than that of Cr. The lower limit of the addition amount 0.1% of Mo is determined as a minimum value from which the effects of Mo addition can be expected. The upper limit of the addition amount 3.0% of Mo is determined because addition of Mo in an amount exceeding the upper limit makes the weld metal excessively hard and deterioration of the toughness significant.

Co differs from Ti in that Co is not an element which strongly produces precipitation hardening. However, Co is an element preferred to Ni from the standpoint of increasing the strength and ensuring the toughness while an increase in the strength is being expected, by the addition of Co. Co is, therefore, an element which should be effectively utilized. However, since Ni is added to the welding wire to ensure a low Ms temperature to such a degree that the effect of decreasing the residual stress can be expected, the lower limit of the addition amount 0.1% of Co is determined as a minimum value from which the effects of adding Co can be expected. On the other hand, since excessive addition of Co results in excessively increasing the strength and deteriorating the toughness, the upper limit of the addition amount is defined to be 2.0%.

Next, reasons for restricting the chemical composition of the Cr-alloyed welding wire will be explained.

C functions to lower the Ms temperature of Fe when added thereto. However, since excessive addition of C causes problems such as weld cracking and deterioration of the toughness of the weld metal, the upper limit of the addition amount of C is defined to be 0.05%. However, when C is not added, it becomes difficult to form martensite, and the residual stress must be decreased with other costly elements alone, which is not economical. The addition amount of C is restricted to at least 0.005% to utilize the low cost element C, and the value is determined as a minimum one from which an economic advantage can be derived.

Si is known as a deoxidizing element. Si has the effect of lowering the oxygen level of the weld metal and steel material. Particularly in weld metal, since there is the danger of air being mixed during welding, adjusting the Si amount to an appropriate value is extremely important. First, as regards the lower limit of Si, when the amount of Si added to the welding wire is less than 0.1%, the deoxidizing effect is lessened and the oxygen content level in the weld metal becomes so high that there is the danger of causing deterioration of the mechanical properties, toughness in particular. Accordingly, the lower limit of the amount of Si in the welding wire is defined to be 0.1%. On the other hand, since excessive addition of Si causes deterioration of the toughness, the upper limit of the amount of Si is defined to be 0.7%.

Mn is known as an element for increasing the strength of the steel. Mn is, therefore, an element which should be effectively utilized from the standpoint of ensuring the yield strength during the transformation expansion, which is a mechanism of decreasing the residual stress in the present invention. The lower limit of the addition amount 0.4% of Mn is determined as a minimum value from which the effect of ensuring the strength can be derived. On the other hand, since excessive addition of Mn causes deterioration of the toughness of the base material and weld metal, the upper limit of the addition amount of Mn is defined to be 2.5%.

P and S are impurities in the present invention. However, when such elements are present in the base material and weld metal in large amounts, the toughness is deteriorated. Accordingly, the upper limit of the addition amounts of P and S are defined to be 0.03% and 0.02%, respectively.

Ni as a simple substance is a metal having an austenitic structure, namely, a face-centered structure. Iron itself has an austenitic structure in a high temperature region, and a ferritic structure, namely, a body-centered structure in a low temperature region. Since addition of Ni makes the face-centered structure of a steel in a high temperature region more stable, the steel has a face-centered structure in a lower temperature region than in cases where Ni is not added, which signifies that the temperature of transformation into a body-centered structure lowers. Moreover, Ni has the effect of improving the toughness of the weld metal when added. The lower limit of the addition amount 4% of Ni in the Cr-alloyed welding wire is determined in the sense that the addition amount is a minimum addition amount of Ni from which the effect of decreasing the residual stress appears and from the standpoint of ensuring the toughness. The upper limit of the addition amount 8% of Ni is determined for the following reasons: the Ms temperature is lowered to some extent as a result of adding Cr (Cr addition will be described below) in the Cr-alloyed welding wire, and addition of Ni in an amount exceeding the upper limit does not bring about a significant effect from the standpoint of decreasing the residual stress; moreover the further addition has the economic disadvantage that Ni thus used is costly.

Cr differs from Ni in that Cr is a ferrite former. However, when Cr is added to iron, the iron is ferritic in a high temperature region, forms austenite in a medium temperature region, and forms ferrite again at lower temperatures. As regards the welding zone, ferrite on the low temperature side is not obtained generally due to the thermal history made by the welding heat input, and martensite is obtained, which signifies that the advantage of adding Cr is derived from an increase in the hardenability. That is, the features of a martensite transformation brought about by Cr addition are the following two points: a ferrite transformation does not take place due to an increase in the hardenability; and the Ms temperature itself lowers. The lower limit of the addition amount 10% of Cr is determined as an amount which effectively utilizes the transformation expansion for decreasing the residual stress while both of the effects are being achieved. The upper limit of the addition amount 15% of Cr is determined because even when Cr in an amount exceeding the upper limit is added, the addition effect is not increased and the economical disadvantage becomes significant.

When the welding wire is coated with Cu, Cu has the effect of improving the conductivity thereof. Cu is, therefore, an element which is effective in improving the welding operation. Moreover, since Cu is an element which improves the hardenability of the weld metal, it is expected to have the effect of promoting the martensite transformation. The lower limit of the addition amount 0.05% of Cu is determined as a minimum value necessary for improving the operation and promoting the martensite transformation. However, excessive addition of Cu is not only ineffective in improving the operation but also industrially unpreferable because the production cost of the welding wire is increased. The upper limit of the addition amount of Cu is determined to be 0.4% for reasons as mentioned above.

Nb combines with C in the weld metal to form carbides. Nb carbides in a small amount function to increase the strength of the weld metal. Accordingly, the economic advantage of their effective utilization is significant. Moreover, the advantage is significant in the sense that the yield strength is increased at the Ms temperature, which is a technology of decreasing the residual stress in the present invention. On the other hand, however, since the formation of the carbides in an excessive amount produces deterioration of the toughness, the upper limit of the addition amount is naturally determined. The lower limit of the addition amount 0.005% of Nb is determined as a minimum value from which the effect of increasing the strength can be expected. The upper limit of the addition amount 0.3% is determined as a value which does not cause a decrease in the reliability of the weld zone as a result of the deterioration of the toughness.

V is an element which acts similarly to Nb. However, V differs from Nb in that V must be added in an amount larger than that of Nb when the same precipitation effect is expected. The lower limit of the addition amount 0.05% of V is determined as a minimum value from which precipitation hardening caused by addition of V can be expected. The upper limit of the addition amount is determined to be 0.5% because precipitation hardening becomes so significant that deterioration of the toughness is caused when V is added in an amount exceeding the upper limit.

Ti forms carbides and causes precipitation hardening similarly to Nb and V. However, as V differs from Nb in precipitation hardening, so Ti also differs from Nb and V therein. The addition amount of Ti is, therefore, determined differently from those of Nb and V. The lower limit of the addition amount 0.005% of Ti is determined as a minimum value from which the effects can be expected, and the upper limit of the addition amount 0.3% is determined, from consideration of deterioration of the toughness.

Mo is also an element which can be expected to precipitation harden the steel similarly to Nb, V and Ti. In order to obtain the effect comparable to that of Nb, V or Ti, Md must be added in an amount exceeding the addition amount of Nb, V or Ti. The lower limit of the addition amount 0.1% of Mo is determined as a minimum value from which an increase in the yield strength caused by precipitation hardening can be expected. Moreover, the upper limit of the addition amount 2.0% is determined from consideration of deterioration of the toughness similarly to Nb, V and Ti.

N is an element which is known as an austenite former. Since martensite tends to be obtained easily when N is added to the steel, N must be added at least in a minimum amount. The lower limit of the addition amount 0.001% is determined as a minimum value for obtaining a low Ms temperature similarly to C. However, excessive addition of N forms nitrides, and causes problems about deterioration of the toughness and the ductility; therefore, the upper limit is determined to be 0.05%.

C and N are similar in their functions, for example, C and N form carbides and nitrides, respectively, and they are austenite formers. Accordingly, the total amount, namely, the upper and lower limit addition amounts of C plus N must be determined. The lower limit of the addition amount 0.001% of C plus N is determined as a minimum value which makes martensite easily obtainable, and which lowers the Ms temperature. Moreover, the upper limit of the addition amount 0.06% of C plus N is determined as a limit value which does not cause problems about deterioration of the toughness and the ductility due to formation of carbides and nitrides.

EXAMPLE 1

Examples according to the first aspect of the present invention will be explained below.

Table 1 shows the chemical composition, the Ms temperature and the yield strength at the Ms temperature of a Ni-alloyed steel for welded structures used for measuring the residual stress. Table 2 shows the chemical composition of a Ni-alloyed welding wire. Table 3 shows the chemical composition, the Ms temperature and the yield strength at the Ms temperature of a Cr-alloyed steel for welded structures. Table 4 shows the chemical composition of a Cr-alloyed welding wire. The Ms temperature and the yield strength at the Ms temperature of a welding wire in Table 2 or 4 were not obtained by directly sampling test pieces from the wire and measuring, but they were obtained by preparing a test joint for measuring the residual stress from the wire in Table 2 or 4, sampling test pieces from the weld metal, and testing the test pieces. That is, the Ms temperature and the yield strength at the Ms temperature in Table 2 or 4 are values obtained on the weld metal prepared from the wire in Table 2or 4. FIG. 1 shows a groove shape for preparing a welded joint using such a steel plate and such a welding wire as mentioned above. Using the groove, TIG multipass welding was conducted under the conditions of 250 A-12 V-11 cm/min, and the resultant residual stress was measured. Moreover, test pieces were sampled from the weld metal of the welded joint for measuring the residual stress, and the Ms temperature and the yield strength at the Ms temperature were measured. The Ms temperature and the yield strength at the Ms temperature are as shown in Table 2 or 4. The residual stress was measured by the so-called stress relief method wherein a strain gauge was applied to the surface of a weld metal portion or heat affected zone, the portion where the strain gauge was applied was cut with a machine to relieve the residual stress, and the relieved strain was measured with the strain gauge.

Table 5 shows the results of measuring the residual stress on the surface of a weld metal when a Ni-alloyed welding wire was used. The measurement was made at the center of the weld bead. It can be understood from Table 5 that all the examples of the invention showed a residual stress of less than 10 kg/mm$^2$, and that Examples 5-4 and 5-5 in which the Ms temperature was low and the yield strength was high showed a compressive residual stress.

Next, Table 6 shows the results of measuring the residual stress of the heat affected zone (referred to as HAZ hereinafter) of a Ni-alloyed steel for welded structures. The measurement was made on the bead toe side of the HAZ. Similarly to Table 5, all the examples of the invention showed a measured residual stress of less than 10 kg/mm$^2$, whereas only one of the comparative examples, namely, Comparative Example 6–10 showed the effects of decreasing a residual stress. In the comparative example, Ti had been added in an amount of 0.4%, and the strength at the Ms temperature was highest. However, as mentioned above in explaining reasons for restricting the chemical composition, the Ti content is in the range where deterioration of the toughness causes a problem. Next, Table 7 shows the results of measuring the residual stress of both a weld metal and a HAZ when a Ni-alloyed steel for welded structures and a Ni-alloyed welding wire were used. Examples 7-2 and 7-3 alone, in which welded joints were prepared with a combination of a steel material and a welding wire in the scope of the present invention, showed a residual stress of less than 10 kg/mm$^2$ which, in more detail, was in a compressive stress state. All the comparative examples showed a large tensile residual stress.

Table 8 shows the results of measuring the residual stress in a weld metal when a Cr-alloyed welding wire was used. It is understood from the table that all the examples showed a residual stress of less than 10 kg/mm$^2$, and that the welding wires of the examples were effective in decreasing the residual stress. Moreover, Table 9 shows the residual stress of a HAZ obtained when a Cr-alloyed steel for welded structures was used. All the examples showed a residual stress of less than 10 kg/mm$^2$ also in this case. In Comparative Examples 9-5, 9-6 and 9-9 where the residual stress remained compressive, steel materials having a Ms temperature of less than 200° C. and Pa which was outside the scope of the present invention were employed, and the comparative examples showed the effects of decreasing the residual stress by the prior art technology. Table 10 shows the results of measuring the residual stress of a HAZ and a weld metal when a Cr-alloyed steel for welded structures and a Cr-alloyed welding wire were used. All the examples showed a residual stress as low as less than 10 kg/mm$^2$.

Table 11 shows the results of measuring the residual stress when a Cr-alloyed steel for welded structures and a Ni-alloyed welding wire were used, and Table 12 shows the results of measuring the residual stress when a Ni-alloyed steel for welded structures and a Cr-alloyed welding wire were used. It is understood from the tables that the residual stress was decreased to less than 10 kg/mm$^2$ in the examples in both cases.

It can be understood from Tables 5 to 12 that a residual stress in a weld zone, namely, in a weld metal, and in a HAZ can be effectively decreased by the present invention.

TABLE 1

Chemical Composition (wt. %), Ms Temperature (° C.), Yield Strength (kg/mm$^2$) at Ms Temperature and Pa of Ni-Alloyed Steels for Welded Structures

| Mark | C | Si | Mn | P | S | Ni | Nb | V | Ti | Cr | Mo | Ms temp. (° C.) | Yield strength (kg/mm$^2$) | Pa | Note |
|---|---|---|---|---|---|---|---|---|---|---|---|---|---|---|---|
| Ni-A | 0.18 | 0.15 | 0.4 | 0.01 | 0.002 | 6.5 | — | — | — | 0.1 | — | 442 | 53.3 | 0.726 | Comp. Ex. |
| Ni-B | 0.15 | 0.20 | 0.6 | 0.007 | 0.003 | 7.0 | 0.005 | — | — | 0.5 | 0.5 | 420 | 55.8 | 0.780 | Comp. Ex. |
| Ni-C1 | 0.12 | 0.25 | 0.2 | 0.011 | 0.001 | 8.2 | 0.05 | — | — | 0.5 | 1.0 | 325 | 75.4 | 0.877 | Example |
| Ni-D | 0.09 | 0.21 | 0.6 | 0.012 | 0.005 | 10.1 | 0.1 | — | — | 0.3 | 0.5 | 248 | 95.3 | 0.970 | Example |
| Ni-E | 0.14 | 0.23 | 0.5 | 0.008 | 0.004 | 9.5 | — | 0.02 | — | — | — | 298 | 55.8 | 0.932 | Comp. Ex. |
| Ni-F | 0.05 | 0.30 | 0.4 | 0.009 | 0.007 | 8.5 | — | 0.15 | — | 2.5 | 2.0 | 278 | 101.2 | 0.968 | Example |
| Ni-G | 0.14 | 0.28 | 1.2 | 0.005 | 0.002 | 9.5 | — | 0.3 | — | — | 0.5 | 282 | 113.6 | 0.958 | Example |
| Ni-H | 0.18 | 0.18 | 0.2 | 0.011 | 0.003 | 8.7 | — | — | 0.05 | 0.5 | 0.8 | 270 | 86.3 | 0.968 | Example |
| Ni-I | 0.09 | 0.19 | 0.3 | 0.007 | 0.006 | 11.1 | — | — | 0.1 | — | 0.5 | 227 | 78.0 | 1.041 | Example |
| Ni-J | 0.14 | 0.20 | 0.2 | 0.015 | 0.001 | 9.0 | — | — | 0.4 | 1.5 | 2.1 | 222 | 131.0 | 1.063 | Comp. Ex. |
| Ni-K | 0.13 | 0.16 | 1.3 | 0.011 | 0.001 | 9.1 | 0.05 | 0.1 | — | 0.7 | 0.9 | 277 | 87.5 | 0.965 | Example |
| Ni-L | 0.08 | 0.19 | 0.3 | 0.007 | 0.002 | 9.8 | — | 0.1 | 0.05 | 1.0 | 0.5 | 276 | 90.1 | 0.965 | Example |
| Ni-M | 0.14 | 0.22 | 0.7 | 0.005 | 0.002 | 9.6 | 0.02 | 0.1 | 0.05 | — | — | 292 | 95.3 | 0.950 | Example |

TABLE 2

Chemical Composition (wt. %), Ms Temperature (° C.), Yield Strength (kg/mm$^2$) at Ms Temperature and Pa of Ni-Alloyed Welding Wires

| Mark | C | Si | Mn | P | S | Ni | Nb | Ti | V | Cr | Mo | Co | Ms temp. (° C.) | Yield Strength (kg/mm$^2$) | Pa | Note |
|---|---|---|---|---|---|---|---|---|---|---|---|---|---|---|---|---|
| Ni-WA | 0.05 | 0.16 | 0.65 | 0.006 | 0.003 | 5.01 | — | — | — | — | — | — | 460 | 35.0 | 0.468 | Comp. Ex. |
| Ni-WB | 0.06 | 0.11 | 0.50 | 0.021 | 0.003 | 5.12 | 0.08 | — | — | — | — | — | 440 | 49.5 | 0.487 | Comp. Ex. |
| Ni-WC | 0.06 | 0.10 | 0.80 | 0.021 | 0.003 | 9.51 | 0.10 | — | 0.4 | 1.0 | 0.5 | — | 310 | 83.0 | 0.921 | Example |
| Ni-WD | 0.05 | 0.11 | 1.00 | 0.020 | 0.004 | 10.8 | 0.05 | 0.02 | 0.4 | 0.5 | 0.5 | 0.5 | 280 | 105.0 | 0.987 | Example |
| Ni-WE | 0.06 | 0.30 | 1.20 | 0.020 | 0.003 | 11.8 | — | 0.01 | 0.8 | — | — | 1.5 | 235 | 115.0 | 1.043 | Example |

Note:
*: values obtained on all deposit metal joints

TABLE 3

Chemical Composition (wt. %), Ms Temperature (° C.), Yield Strength (kg/mm$^2$) at Ms Temperature and Pa of Cr-Alloyed Steels for Welded Structures

| Mark | C | Si | Mn | P | S | Ni | Cr | Nb | Mo | Ti | V | N | Ms (° C.) | Yield strength | Pa | Note |
|---|---|---|---|---|---|---|---|---|---|---|---|---|---|---|---|---|
| Cr-A | 0.007 | 0.11 | 0.47 | 0.019 | 0.004 | 2.51 | 12.9 | — | — | — | — | 0.0021 | 390 | 53.0 | 0.755 | Comp. Ex. |
| Cr-B | 0.008 | 0.11 | 0.47 | 0.019 | 0.004 | 4.81 | 12.9 | — | — | — | — | 0.0023 | 300 | 65.2 | 0.945 | Example |
| Cr-C1 | 0.013 | 0.10 | 0.46 | 0.018 | 0.004 | 6.81 | 13.0 | — | — | — | — | 0.0019 | 214 | 68.0 | 1.123 | Example |
| Cr-D | 0.060 | 0.11 | 0.44 | 0.019 | 0.004 | 2.55 | 14.7 | — | — | — | — | 0.0025 | 293 | 55.8 | 0.884 | Comp. Ex. |
| Cr-E | 0.010 | 0.12 | 0.47 | 0.018 | 0.004 | 6.65 | 15.1 | — | — | — | — | 0.0026 | 164 | 70.4 | 1.191 | Comp. Ex. |
| Cr-F | 0.120 | 0.11 | 0.45 | 0.018 | 0.004 | 8.75 | 16.8 | — | — | — | — | 0.0029 | 100 | 80.2 | 1.465 | Comp. Ex. |
| Cr-G | 0.010 | 0.10 | 1.20 | 0.017 | 0.003 | 3.00 | 9.2 | — | — | — | — | 0.0020 | 451 | 52.7 | 0.677 | Comp. Ex. |
| Cr-H | 0.001 | 0.10 | 0.40 | 0.018 | 0.003 | 2.95 | 13.0 | — | — | — | — | 0.0023 | 386 | 55.3 | 0.768 | Comp. Ex. |
| Cr-I | 0.011 | 0.10 | 1.10 | 0.018 | 0.003 | 7.22 | 16.8 | — | — | — | — | 0.0027 | 90 | 73.0 | 1.314 | Comp. Ex. |
| Cr-J | 0.010 | 0.11 | 0.46 | 0.019 | 0.003 | 4.98 | 14.6 | 0.05 | — | — | — | 0.0021 | 232 | 76.5 | 1.048 | Example |
| Cr-K | 0.006 | 0.10 | 0.44 | 0.018 | 0.003 | 3.11 | 7.0 | 0.10 | — | — | — | 0.0025 | 536 | 60.8 | 0.557 | Comp. Ex. |
| Cr-L | 0.008 | 0.11 | 0.46 | 0.018 | 0.003 | 4.98 | 14.3 | 0.20 | — | — | — | 0.0018 | 230 | 82.1 | 1.050 | Example |
| Cr-M | 0.030 | 0.10 | 0.98 | 0.018 | 0.003 | 5.03 | 13.0 | — | 0.48 | — | — | 0.0024 | 260 | 75.0 | 1.016 | Example |
| Cr-N1 | 0.008 | 0.10 | 1.01 | 0.018 | 0.003 | 5.09 | 14.1 | — | 1.00 | — | — | 0.0021 | 217 | 79.1 | 1.072 | Example |
| Cr-O | 0.013 | 0.11 | 0.48 | 0.018 | 0.003 | 5.04 | 12.0 | — | 1.59 | — | — | 0.0020 | 230 | 80.9 | 1.017 | Example |
| Cr-P1 | 0.025 | 0.12 | 0.44 | 0.020 | 0.003 | 4.97 | 11.5 | — | — | 0.07 | — | 0.0030 | 325 | 63.0 | 0.918 | Example |
| Cr-Q | 0.024 | 0.11 | 0.45 | 0.019 | 0.003 | 2.55 | 10.0 | — | — | 0.16 | — | 0.0031 | 445 | 79.6 | 0.653 | Comp. Ex. |
| Cr-R | 0.023 | 0.12 | 0.44 | 0.021 | 0.003 | 5.02 | 12.0 | — | — | 0.28 | — | 0.0024 | 241 | 82.1 | 0.941 | Example |
| Cr-S1 | 0.040 | 0.12 | 1.10 | 0.021 | 0.003 | 5.02 | 13.8 | — | — | — | 0.20 | 0.0023 | 254 | 74.0 | 1.033 | Example |
| Cr-T | 0.023 | 0.12 | 1.10 | 0.021 | 0.003 | 2.55 | 11.0 | — | — | — | 0.20 | 0.0022 | 416 | 68.0 | 0.694 | Comp. Ex. |
| Cr-U | 0.023 | 0.12 | 1.00 | 0.021 | 0.003 | 5.02 | 13.5 | — | — | — | 0.40 | 0.0027 | 266 | 80.5 | 1.003 | Example |

TABLE 4

Chemical Composition (wt. %), Ms Temperature (° C.), Yield Strength (kg/mm$^2$) at Ms Temperature and Pa of Cr-Alloyed Welding Wires

| Mark | C | Si | Mn | P | S | Ni | Cr | Nb | Mo | Ti | V | N | Ms (° C.) | Yield strength | Pa | Note |
|---|---|---|---|---|---|---|---|---|---|---|---|---|---|---|---|---|
| Cr-WA | 0.025 | 0.11 | 0.90 | 0.021 | 0.003 | 5.01 | 13.5 | — | — | — | — | 0.0029 | 266 | 65.0 | 1.006 | Comp. Ex. |
| Cr-WB | 0.05 | 0.11 | 0.50 | 0.021 | 0.003 | 5.12 | 13.5 | 0.08 | — | — | — | 0.0028 | 253 | 74.5 | 1.309 | Example |
| Cr-WC | 0.05 | 0.10 | 0.80 | 0.021 | 0.003 | 3.01 | 11.0 | — | — | 0.10 | — | 0.0025 | 404 | 70.0 | 0.759 | Example |
| Cr-WD | 0.04 | 0.11 | 1.00 | 0.020 | 0.004 | 5.02 | 11.1 | — | 0.50 | — | — | 0.0024 | 312 | 71.2 | 0.947 | Comp. Ex. |
| Cr-WE | 0.06 | 0.30 | 1.20 | 0.020 | 0.003 | 5.09 | 8.1 | — | — | — | — | 0.0026 | 405 | 48.0 | 0.822 | Comp. Ex. |
| Cr-WF | 0.06 | 0.12 | 1.40 | 0.021 | 0.003 | 4.05 | 9.1 | 0.11 | — | — | — | 0.0021 | 418 | 55.2 | 0.777 | Comp. Ex. |
| Cr-WG | 0.05 | 0.12 | 1.00 | 0.022 | 0.004 | 5.11 | 7.3 | — | — | — | — | 0.0019 | 432 | 38.7 | 0.780 | Comp. Ex. |
| Cr-WH | 0.07 | 0.12 | 1.00 | 0.021 | 0.004 | 5.16 | 7.1 | — | — | — | — | 0.0026 | 429 | 40.5 | 0.796 | Comp. Ex. |
| Cr-WI | 0.04 | 0.12 | 1.10 | 0.020 | 0.003 | 6.08 | 13.1 | 0.05 | — | — | 0.15 | 0.0023 | 205 | 78.5 | 1.093 | Comp. Ex. |

TABLE 5

Results of Measuring Residual Stress of Weld Metals Obtained by Using Ni-Alloyed Welding Wires (kg/mm$^2$)

| No. | Steel material | Wire | X[1] | Y[2] | Note |
|---|---|---|---|---|---|
| 5-1 | Ni-A | Ni-WA | 43.2 | 25.9 | Comp. Ex. |
| 5-2 | Ni-A | Ni-WB | 58.0 | 30.9 | Comp. Ex. |
| 5-3 | Ni-A | Ni-Wc | 8.0 | 3.3 | Example |
| 5-4 | Ni-A | Ni-WD | −12.5 | −7.4 | Example |
| 5-5 | Ni-A | Ni-WE | −40.5 | −25.4 | Example |

Note:
[1] weld line direction;
[2] direction vertical to weld line

TABLE 6

Results of Measuring Residual Stress in Heat Affected Zones of Ni-Alloyed Steels for Welded Structures (kg/mm$^2$)

| No. | Steel material | Wire | X[1] | Y[2] | Note |
|---|---|---|---|---|---|
| 6-1 | Ni-A | Ni-WA | 40.3 | 21.5 | Comp. Ex. |
| 6-2 | Ni-B | Ni-WA | 30.0 | 13.1 | Comp. Ex. |
| 6-3 | Ni-Cl | Ni-WA | −2.0 | 4.4 | Example |
| 6-4 | Ni-D | Ni-WA | −17.5 | −8.5 | Example |
| 6-5 | Ni-E | Ni-WA | 38.9 | 20.8 | Comp. Ex. |
| 6-6 | Ni-F | Ni-WA | −17.5 | −12.2 | Example |
| 6-7 | Ni-G | Ni-WA | −42.3 | −22.1 | Example |
| 6-8 | Ni-H | Ni-WA | 2.3 | 1.6 | Example |
| 6-9 | Ni-I | Ni-WA | −10.1 | −6.3 | Example |
| 6-10 | Ni-J | Ni-WA | −50.1 | −29.3 | Comp Ex. |
| 6-11 | Ni-K | Ni-WA | −19.0 | −9.1 | Example |
| 6-12 | Ni-L | Ni-WA | −21.1 | −12.1 | Example |
| 6-13 | Ni-M | Ni-WA | −28.3 | −13.5 | Example |

Note:
[1] weld line direction;
[2] direction vertical to weld line

TABLE 7

Results of Measuring Residual Stress of Weld Metals and Heat Affected Zones Obtained by Using Ni-Alloyed Steels for Welded Structures and Ni-Alloyed Welding Wires (kg/mm$^2$)

| No. | Steel material | Wire | HAZ X[1] | HAZ Y[2] | Weld metal X[1] | Weld metal Y[2] | Note |
|---|---|---|---|---|---|---|---|
| 7-1 | Ni-A | Ni-WA | 40.3 | 21.5 | 43.2 | 25.9 | Comp. Ex. |
| 7-2 | Ni-C1 | Ni-WD | −1.5 | 4.8 | −10.1 | −7.1 | Example |
| 7-3 | Ni-D | Ni-WE | −16.3 | −9.3 | −35.1 | −25.3 | Example |
| 7-4 | Ni-E | Ni-WB | 29.1 | 17.7 | 48.3 | 33.6 | Comp. Ex. |
| 7-5 | Ni-A | Ni-WB | 38.6 | 26.8 | 50.6 | 26.5 | Comp. Ex. |

Note:
[1] weld line direction;
[2] direction vertical to weld line

TABLE 8

Results of Measuring Residual Stress of Weld Metals Obtained by Using Cr-Alloyed Welding Wires (kg/mm$^2$)

| No. | Steel material | Wire | X[1] | Y[2] | Note |
|---|---|---|---|---|---|
| 8-1 | Cr-A | Cr-WA | −5.2 | 2.1 | Example |
| 8-2 | Cr-A | Cr-WB | −9.5 | −5.8 | Example |
| 8-3 | Cr-A | Cr-WC | 25.0 | 15.8 | Comp. Ex. |
| 8-4 | Cr-A | Cr-WD | 6.9 | −4.8 | Example |
| 8-5 | Cr-A | Cr-WB | 45.3 | 38.9 | Comp. Ex. |
| 8-6 | Cr-A | Cr-WF | 48.2 | 22.9 | Comp. Ex. |
| 8-7 | Cr-A | Cr-WS | 52.8 | 31.8 | Comp. Ex. |
| 8-8 | Cr-A | Cr-WH | 45.9 | 33.1 | Comp. Ex. |
| 8-9 | Cr-A | Cr-WI | −32.5 | −18.9 | Example |

Note:
[1] weld line direction;
[2] direction vertical to weld line

TABLE 9

Results of Measuring Residual Stress of Heat Affected Zones in Cr-Alloyed Steels for Welded Structures (kg/mm$^2$)

| No. | Steel material | Wire | X[1] | Y[2] | Note |
|---|---|---|---|---|---|
| 9-1 | Cr-A | Cr-WA | 28.0 | 9.5 | Comp. Ex. |
| 9-2 | Cr-B | Cr-WA | 7.0 | 2.0 | Example |
| 9-3 | Cr-Cl | Cr-WA | −21.0 | −13.0 | Example |
| 9-4 | Cr-D | Cr-WA | 18.0 | 10.2 | Comp. Ex. |
| 9-5 | Cr-E | Cr-WA | −31.3 | −12.8 | Comp. Ex. |

TABLE 9-continued

Results of Measuring Residual Stress of Heat Affected Zones in Cr-Alloyed Steels for Welded Structures (kg/mm$^2$)

| No. | Steel material | Wire | X[1] | Y[2] | Note |
|---|---|---|---|---|---|
| 9-6 | Cr-F | Cr-WA | −18.5 | −12.2 | Comp. Ex. |
| 9-7 | Cr-G | Cr-WA | 63.1 | 38.5 | Comp. Ex. |
| 9-8 | Cr-H | Cr-WA | 52.3 | 21.5 | Comp. Ex. |
| 9-9 | Cr-I | Cr-WA | −10.5 | −5.0 | Comp. Ex. |
| 9-10 | Cr-J | Cr-WA | −35.1 | −18.3 | Example |
| 9-11 | Cr-K | Cr-WA | 55.3 | 35.1 | Comp. Ex. |
| 9-12 | Cr-L | Cr-WA | −43.5 | −28.1 | Example |
| 9-13 | Cr-M | Cr-WA | −30.5 | −16.5 | Example |
| 9-14 | Cr-N | Cr-WA | −45.8 | −32.1 | Example |
| 9-15 | Cr-O | Cr-WA | −50.1 | −41.0 | Example |
| 9-16 | Cr-P1 | Cr-WA | 6.5 | 4.4 | Example |
| 9-17 | Cr-Q | Cr-WA | 51.5 | 21.8 | Comp. Ex. |
| 9-18 | Cr-R | Cr-WA | −48.3 | −31.9 | Example |
| 9-19 | Cr-S1 | Cr-WA | −43.1 | −25.5 | Example |
| 9-20 | Cr-T | Cr-WA | 42.1 | 24.3 | Comp. Ex. |
| 9-21 | Cr-U | Cr-WA | −38.1 | −29.3 | Example |

Note:
[1] weld line direction;
[2] direction vertical to weld line

TABLE 10

Results of Measuring Residual Stress of Weld Metals and Heat Affected Zones Obtained by Using Cr-Alloyed Steels for Welded Structures and Cr-Alloyed Welding Wires (kg/mm$^2$)

| | Steel | | HAZ | | Weld metal | | |
|---|---|---|---|---|---|---|---|
| No. | material | Wire | X[1] | Y[2] | X[1] | Y[2] | Note |
| 10-1 | Cr-A | Cr-WC | 31.5 | 18.3 | 28.3 | 18.2 | Comp. Ex. |
| 10-2 | Cr-B | Cr-WD | 6.3 | 1.1 | 3.1 | −5.5 | Example |
| 10-3 | Cr-C1 | Cr-WI | −25.3 | −14.3 | −39.1 | −15.8 | Example |
| 10-4 | Cr-D | Cr-WE | 21.0 | 12.3 | 48.3 | 30.6 | Comp. Ex. |
| 10-5 | Cr-C | Cr-WH | 71.3 | 49.2 | 31.1 | 20.5 | Comp. Ex. |

Note:
[1] weld line direction;
[2] direction vertical to weld line

TABLE 11

Results of Measuring Residual Stress of Weld Metals and Heat Affected Zones Obtained by Using Cr-Alloyed Steels for Welded Structures and Ni-Alloyed Welding Wires (kg/mm$^2$)

| | Steel | | HAZ | | Weld metal | | |
|---|---|---|---|---|---|---|---|
| No. | material | Wire | X[1] | Y[2] | X[1] | Y[2] | Note |
| 11-1 | Cr-A | Ni-WA | 27.0 | −9.2 | 41.2 | 22.4 | Comp. Ex. |
| 11-2 | Cr-B | Ni-WC | 5.2 | 1.1 | 3.1 | −1.5 | Example |
| 11-3 | Cr-C1 | Ni-WE | −23.3 | −15.2 | −13.1 | −8.9 | Example |
| 11-4 | Cr-D | Ni-WB | 21.0 | 11.3 | 51.3 | 34.1 | Comp. Ex. |
| 11-5 | Cr-G | Ni-WB | 70.3 | 48.2 | 48.1 | 27.8 | Comp. Ex. |

Note:
[1] weld line direction;
[2] direction vertical to weld line

TABLE 12

Results of Measuring Residual Stress of Weld Metals and Heat Affected Zones Obtained by Using Ni-Alloyed Steels for Welded Structures and Cr-Alloyed Welding Wires (kg/mm$^2$)

| | Steel | | HAZ | | Weld metal | | |
|---|---|---|---|---|---|---|---|
| No. | material | Wire | X[1] | Y[2] | X[1] | Y[2] | Note |
| 12-1 | Ni-A | Cr-WC | 41.0 | 22.5 | 22.3 | 15.1 | Comp. Ex. |
| 12-2 | Ni-C1 | Cr-WD | 4.3 | −2.1 | −8.1 | −3.1 | Example |
| 12-3 | Ni-D | Cr-WI | −25.3 | −10.3 | −39.1 | −15.8 | Example |
| 12-4 | Ni-E | Cr-WE | 29.0 | 17.3 | 48.3 | 30.6 | Comp. Ex. |
| 12-5 | Ni-A | Cr-WH | 38.6 | 26.8 | 50.1 | 25.5 | Comp. Ex. |

Note:
[1] weld line direction;
[2] direction vertical to weld line

EXAMPLE 2

Next, examples according to the second aspect of the present invention will be explained.

First, examples in which Ni-alloyed welding wires were used will be explained.

Table 13 shows the chemical composition, the Ms temperature and Pa of a TIG welding wire for preparing a welded joint. The Ms temperature shown in Table 13 was obtained by sampling a test piece from the weld metal portion of a welded joint prepared for measuring the residual stress, and measuring the Ms temperature. Two welded joints with a groove as shown in FIG. 1 were prepared under the same conditions, and welding conditions of 250 A-12 V-12 cpm, using a welding wire in Table 13. One of the two welded joints prepared above was further subjected to TIG remelt-run welding.

The residual stress was measured by the stress relief method wherein a strain gauge was applied to the surface of a weld metal portion, the portion where the strain gauge was applied was cut with a machine to relieve the residual stress, and the relieved strain was measured with the strain gauge.

For the welded joint which was not subjected to TIG remelt-run welding, the residual stress had a chance of differing among beads. Accordingly, strain gauges were applied at the center of the beads, respectively. Since the surface of a welded joint which was subjected to TIG remelt-run welding was melted once, strain gauges were applied to the same positions as in the welded joint which had not been subjected to TIG remelt-run welding.

Table 14 shows the results of measuring the residual stress. The measurement positions 1, 2 and 3 in Table 14 designate a first, a second and a third bead in the final layer, and the third bead is the final one in the final layer.

It is seen from Table 14 that when the welding wires Ni-WA and Ni-WB the weld metals of which showed Ms temperatures outside the scope of the present invention and which had chemical compositions and Pa outside the scope of the invention were used, the entire surface of the weld metals showed no decrease in the residual stress even after TIG remelt-run welding had been conducted. When the welding wire Ni-WA was used and TIG remelt-run welding was not conducted; the first bead showed a compressive residual stress for the following reasons: in addition to relieving the initial residual stress by the welding heat of the second and the third bead, the thermal contraction of the third bead acted to generate a compressive stress in the first bead. The residual stress became compressive not because of the characteristics of the welding material.

For the welding wires Ni-WC and Ni-WD the weld metals of which showed Ms temperatures in the scope of the present invention and which had chemical compositions and Pa in the scope of the invention, it is understood that when TIG remelt-run welding was not conducted, the residual stress was surely decreased in the third bead, namely, the final bead. That is, the results show that the residual stress was decreased in accordance with the chemical composition of the welding wire. However, it is understood from a comparison between the examples in which TIG remelt-run welding was conducted and the comparative examples in which TIG remelt-run was not conducted that the TIG remelt-run welding was effective from the standpoint of decreasing the residual stress of the weld metal surface as a whole because a high tensile residual stress was generated in the first and the second bead in the above-mentioned comparative examples.

Next, examples in which Cr-alloyed welding wires were used will be explained.

Table 15 shows the chemical composition, the Ms A temperature and Pa of a TIG welding wire used for preparing a welded joint. The Ms temperature shown in Table 15 was obtained by sampling a test piece from a weld metal portion of the welded joint having been prepared for the purpose of measuring the residual stress, and measuring the Ms temperature. Using a wire in Table 15, a welded joint was prepared under the same conditions as explained in the examples in the Ni-alloyed welding wires, and the residual stress was measured by the same procedure. Table 16 shows the results thus obtained.

It can be seen from Table 16 that a welded joint obtained by using one of the three welding wires Cr-WA, Cr-WB and Cr-WD in the scope of the present invention and conducting TIG remelt-run welding showed a uniformly decreased residual stress on the entire surface of the weld metal. When a welded joint was prepared using one of the welding wires Cr-WA, Cr-WB and Cr-WD in the scope of the invention without conducting TIG remelt-run welding, the residual stress in the first and the second bead was not decreased, though the residual stress of the third bead (final bead) was decreased. When the welding wire Cr-WC or Cr-WE outside the scope of the present invention was used, a uniform decrease in the residual stress on the entire surface of the weld metal was never observed regardless of whether or not TIG remelt-run welding was conducted.

TABLE 13

Chemical Composition (wt. %), Ms Temperature (° C.) and Pa of Ni-Alloyed Welding Wires

| Mark | C | Si | Mn | P | S | Ni | Cr | Nb | Mo | Ti | V | Co | Ms Temp. (° C.) | Pa |
|---|---|---|---|---|---|---|---|---|---|---|---|---|---|---|
| Ni-WA | 0.06 | 0.11 | 1.90 | 0.021 | 0.003 | 2.0 | — | — | — | — | — | — | 450 | 0.227 |
| Ni-WB | 0.05 | 0.11 | 0.50 | 0.021 | 0.003 | 9.1 | — | — | — | — | — | — | 330 | 0.818 |
| Ni-WC | 0.04 | 0.11 | 1.00 | 0.020 | 0.004 | 10.0 | 0.8 | — | 1.0 | 0.01 | 0.7 | — | 275 | 0.959 |
| Ni-WD | 0.04 | 0.12 | 1.10 | 0.020 | 0.003 | 11.1 | 1.5 | 0.05 | — | — | 0.6 | 1.2 | 235 | 1.028 |

TABLE 14

Results of Measuring Residual Stress of Weld Metals Obtained by Using Ni-Alloyed Welding Wires ($kg/mm^2$)

| Wire mark | Position for measuring residual stress | | | | | | TIG remelt-run | Note |
|---|---|---|---|---|---|---|---|---|
| | 1 | | 2 | | 3 | | | |
| | X | Y | X | Y | X | Y | | |
| Ni-WA | −1.8 | −2.5 | 19.5 | 23.1 | 50.5 | 23.1 | no | Comp. Ex. |
| Ni-WA | 42.3 | 19.6 | 48.2 | 25.1 | 48.3 | 35.0 | yes | Comp. Ex. |
| Ni-WB | 0.2 | 5.3 | 18.3 | 11.1 | 18.5 | 8.7 | no | Comp. Ex. |
| Ni-WB | 22.0 | 8.5 | 20.8 | 10.1 | 16.3 | 7.1 | yes | Comp. Ex. |
| Ni-WC | 18.8 | 11.1 | 28.3 | 13.5 | −25.5 | −11.7 | no | Comp. Ex. |
| Ni-WC | −22.1 | −10.0 | −18.3 | −8.3 | −23.5 | −18.3 | yes | Example |
| Ni-WD | 20.1 | 10.2 | 12.3 | 11.3 | −29.3 | −12.1 | no | Comp. Ex. |
| Ni-WD | −35.3 | −8.1 | −28.2 | −18.6 | −29.0 | −15.1 | yes | Example |

Note:
1: The numerals 1, 2 and 3 in the position for measuring residual stress designate a first, a second and a third bead, respectively in the final layer.
2: X designates the weld line direction, and Y designates the direction vertical to the weld line.

TABLE 15

Chemical Composition (wt. %), Ms Temperature (° C.) and Pa of Cr-Alloyed Welding Wires

| Mark | C | Si | Mn | P | S | Ni | Cr | Nb | Mo | Ti | V | N | Ms Temp. (° C.) | Pa |
|---|---|---|---|---|---|---|---|---|---|---|---|---|---|---|
| Cr-WA | 0.025 | 0.11 | 0.90 | 0.021 | 0.003 | 5.01 | 13.5 | — | — | — | — | 0.0029 | 266 | 1.005 |
| Cr-WB | 0.05 | 0.11 | 0.50 | 0.021 | 0.003 | 5.12 | 13.5 | 0.08 | 1.0 | — | — | 0.0028 | 223 | 1.092 |
| Cr-WC | 0.05 | 0.10 | 0.80 | 0.021 | 0.003 | 3.01 | 11.0 | — | — | 0.10 | — | 0.0025 | 404 | 0.759 |
| Cr-WD | 0.04 | 0.11 | 1.00 | 0.020 | 0.004 | 5.02 | 11.1 | — | — | — | — | 0.0024 | 312 | 0.947 |
| Cr-WE | 0.06 | 0.30 | 1.20 | 0.020 | 0.003 | 5.08 | 8.1 | — | — | — | — | 0.0026 | 405 | 0.821 |

TABLE 16

Results of Measuring Residual Stress of Weld Metals Obtained by using Cr-Alloyed Welding Wires (kg/mm$^2$)

| Wire mark | Position for measuring residual stress | | | | | | TIG remelt-run | Note |
|---|---|---|---|---|---|---|---|---|
| | 1 | | 2 | | 3 | | | |
| | X | Y | X | Y | X | Y | | |
| Cr-WA | 30.8 | 25.5 | 5.5 | −10.1 | −30.2 | −15.1 | no | Comp. Ex. |
| Cr-WA | −32.3 | −19.6 | −38.2 | −15.1 | −25.3 | −12.0 | yes | Example |
| Cr-WB | 25.3 | 15.1 | 6.8 | 2.5 | −25.5 | −10.5 | no | Comp. Ex. |
| Cr-WB | −20.8 | −12.6 | −18.2 | −10.3 | −10.5 | −6.5 | yes | Example |
| Cr-WC | −5.9 | 1.9 | 18.3 | 8.5 | 35.0 | 15.8 | no | Comp. Ex. |
| Cr-WC | 43.5 | 20.5 | 41.3 | 13.5 | 30.3 | 18.1 | yes | Comp. Ex. |
| Cr-WD | 30.1 | 18.2 | 12.3 | 5.3 | −8.5 | −4.5 | no | Comp. Ex. |
| Cr-WD | −15.3 | −8.1 | −20.2 | −11.6 | −19.0 | −10.1 | yes | Example |
| Cr-WE | −10.1 | −8.2 | 12.3 | 8.3 | 45.3 | 38.9 | no | Comp. Ex. |
| Cr-We | 35.3 | 17.1 | 48.2 | 25.6 | 45.0 | 20.1 | yes | Comp. Ex |

Note:
1: The numerals 1, 2 and 3 in the position for measuring residual stress designate a first, a second and a third bead, respectively in the final layer.
2: X designates the weld line direction, and Y designates the direction vertical to the weld line.

Possibility of Utilization in the Industry

The residual stress generated in a weld zone can be decreased by the present invention, and as a result the stress corrosion cracking characteristics, the brittle fracture characteristics and the fatigue characteristics of the weld zone can be improved. The present invention, therefore, greatly contributes to the improvement of the reliability of welded structures, and has a considerable advantage in the industry.

What is claimed is:

1. A steel for welded structures which starts a transformation from austenite into martensite at a temperature from at least 200° C. to 350° C., and which has a yield strength from at least 60 kg/mm$^2$ to 120 kg/mm$^2$ at the transformation starting temperature;
wherein a parameter Pa defined by the formula $$Pa = C + Ni/12 + Cr/24 + Mo/19,$$

wherein C, Ni, Cr and Mo represent respective element contents in terms of percent by weight, is from at least 0.85 to 1.15; and
wherein the steel consists of, based on weight, 0.01 to 0.2% of C, 0.01 to 0.4% of Si, 0.2 to 1.5% of Mn, 8 to 12% of Ni, one or more of the following elements in the following contents: 0.005 to 0.3% of Ti, 0.005 to 0.3% of Nb and 0.05 to 0.5% of V, and the balance of Fe and unavoidable impurities, P and S of the unavoidable impurities being in respective contents of up to 0.03% and up to 0.02% and
wherein the steel further consists of, based on weight, one or more of the following elements in the following contents: 0.1 to 3.0% of Cr and 0.1 to 3.0% of Mo.

2. A welding wire for forming a weld metal in a weld joint, the weld metal starting a transformation from austenite into martensite at a temperature from at least 200° C. to 350° C., and having a yield strength from at least 60 kg/mm$^2$ to 120 kg/mm$^2$ at the transformation starting temperature;
wherein a parameter Pa defined by the formula $$Pa = C + Ni/12 + Cr/24 + Mo/19,$$

wherein C, Ni, Cr and Mo represent the respective element contents in terms of percent by weight, is from at least 0.85 to 1.15; and
wherein the welding wire consists of, based on weight, 0.01 to 0.2% of C, 0.1 to 0.5% of Si, 0.01 to 1.5% of Mn, 8 to 12% of Ni, one or more of the following elements in the following contents: 0.01 to 0.4% of Ti, 0.01 to 0.4% of Nb and 0.3 to 1.0% of V, and the balance of Fe and unavoidable impurities, P and S of the unavoidable impurities being in respective contents of up to 0.03% and up to 0.02%; and
wherein the welding wire further consists of, based on weight, one or more of the following elements in the following contents: 0.05 to 0.4% of Cu, 0.1 to 3.0% of Cr, 0.1 to 3.0% of Mo and 0.1 to 2.0% of Co.

* * * * *

UNITED STATES PATENT AND TRADEMARK OFFICE
CERTIFICATE OF CORRECTION

PATENT NO.    : 6,428,633 B1
DATED         : August 6, 2002
INVENTOR(S)   : Tadashi Kasuya et al.

It is certified that error appears in the above-identified patent and that said Letters Patent is hereby corrected as shown below:

Title page,
Item [73], Assignee, change "Nippin Steel Corporation" to -- Nippon Steel Corporation --.

Signed and Sealed this

Twenty-eighth Day of October, 2003

JAMES E. ROGAN
*Director of the United States Patent and Trademark Office*